US009051046B2

(12) United States Patent
Ivans

(10) Patent No.: US 9,051,046 B2
(45) Date of Patent: Jun. 9, 2015

(54) VERTICAL SUPPORT SYSTEM

(71) Applicant: Bell Helicopter Textron Inc., Fort Worth, TX (US)

(72) Inventor: Steven Ivans, Ponder, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 120 days.

(21) Appl. No.: 13/622,179

(22) Filed: Sep. 18, 2012

(65) Prior Publication Data

US 2014/0077032 A1    Mar. 20, 2014

(51) Int. Cl.
*B64C 25/12* (2006.01)

(52) U.S. Cl.
CPC ........... *B64C 25/12* (2013.01); *B64C 2025/125* (2013.01)

(58) Field of Classification Search
CPC .. B64C 25/14; B64C 25/52; B64C 2025/008; B64C 2025/125; B64C 25/12; A47B 3/0915; A47C 3/38
USPC ................ 244/102 R, 102 A, 102 SS, 100 R; 248/434, 439, 188.6
See application file for complete search history.

(56) References Cited

U.S. PATENT DOCUMENTS

| | | | | | |
|---|---|---|---|---|---|
| 1,732,209 | A | * | 10/1929 | Aberg | ............................ 244/101 |
| 1,981,856 | A | * | 11/1934 | Downey | .................... 244/102 R |
| 2,030,293 | A | * | 2/1936 | Haberlin | ................... 244/102 R |
| 2,262,762 | A | | 11/1941 | Hicks | |
| 2,403,835 | A | * | 7/1946 | Villcpigue | ................ 244/102 R |
| 2,478,426 | A | * | 8/1949 | Satre | ......................... 244/102 R |
| 2,974,909 | A | * | 3/1961 | Perdue | ...................... 244/102 R |
| 2,982,499 | A | * | 5/1961 | Cameron-Johnson | .... 244/102 R |
| 3,088,699 | A | * | 5/1963 | Larson | ...................... 244/102 R |
| 3,225,865 | A | * | 12/1965 | Downey | ........................ 182/155 |
| 3,372,892 | A | * | 3/1968 | Poncia et al. | ............. 244/102 R |
| 3,485,464 | A | * | 12/1969 | Jervan | ...................... 244/102 R |
| 3,532,307 | A | * | 10/1970 | Larson | .................... 244/102 SS |

(Continued)

FOREIGN PATENT DOCUMENTS

| | | |
|---|---|---|
| EP | 2450277 A2 | 5/2012 |
| FR | 1240657 A | 9/1960 |
| FR | 2023793 A1 | 8/1970 |

OTHER PUBLICATIONS

English machine translation of FR 2023793.*

(Continued)

*Primary Examiner* — Valentina Xavier
*Assistant Examiner* — Alexander V Giczy
(74) *Attorney, Agent, or Firm* — Fish & Richardson P.C.

(57) ABSTRACT

A vertical support system includes a first articulated leg assembly configured to carry a first load, the first articulated leg assembly being selectively movable between a first retracted configuration and a first loaded configuration and a second articulated leg assembly configured to carry a second load substantially kinematically identical to the first articulated leg assembly, the second articulated leg assembly being selectively movable between a second retracted configuration and a second loaded configuration. The arrangement of axis of rotations and offset angles of the first and/or second lees of each articulated leg assembly may produce a lateral width ratio. A first vertical footprint of the first articulated leg assembly overlaps a second vertical footprint of the second articulated leg assembly when the leg assemblies are retracted.

21 Claims, 32 Drawing Sheets

(56) References Cited

U.S. PATENT DOCUMENTS

| | | | | |
|---|---|---|---|---|
| 3,796,430 | A | * | 3/1974 | Sudo .................... 280/87.05 |
| 3,951,361 | A | | 4/1976 | Hrusch |
| 4,034,684 | A | * | 7/1977 | Carson et al. ................ 108/127 |
| 4,199,119 | A | * | 4/1980 | Masclet .................. 244/102 SS |
| 4,422,602 | A | * | 12/1983 | Turiot ...................... 244/102 R |
| 4,537,374 | A | | 8/1985 | Barnoin et al. |
| 4,972,924 | A | * | 11/1990 | Nielsen ......................... 182/152 |
| 6,349,901 | B1 | * | 2/2002 | Grossman ................. 244/102 R |
| 6,464,168 | B1 | | 10/2002 | Swannell et al. |
| 6,666,407 | B2 | | 12/2003 | Pancotti |
| 7,337,728 | B2 | * | 3/2008 | Shabram et al. ................ 108/35 |
| 7,429,019 | B1 | | 9/2008 | Bietenhader |
| 2005/0178900 | A1 | * | 8/2005 | Quayle ...................... 244/102 R |
| 2009/0057484 | A1 | * | 3/2009 | White ....................... 244/102 A |
| 2010/0025523 | A1 | * | 2/2010 | Kutzmann et al. ................. 244/2 |
| 2011/0031348 | A1 | * | 2/2011 | Thompson ................ 244/102 R |
| 2012/0111999 | A1 | * | 5/2012 | Acks et al. ................ 244/102 A |
| 2012/0145878 | A1 | * | 6/2012 | Zoll .............................. 248/688 |

OTHER PUBLICATIONS

Communication from a Counter-Part Application; European Office Action; European Application No. EP 12190291.0; Apr. 5, 2013; 4 pgs.

Communication from a Counter-Part Application; European Extended Search Report; European Application No. EP 12190291.0; Jun. 28, 2013; 8 pgs.

Communication from a Counter-Part Application; New European Extended Search Report; European Application No. EP 12190291.0; Jul. 1, 2013; 8 pgs.

Foreign Communication From a Counterpart Application, European Application No. 12190291.0, European Office Action dated Nov. 20, 2013, 4 pages.

Office Action issued in Canadian Application No. 2,823,082 on Jan. 28, 2015; 11 pages.

* cited by examiner

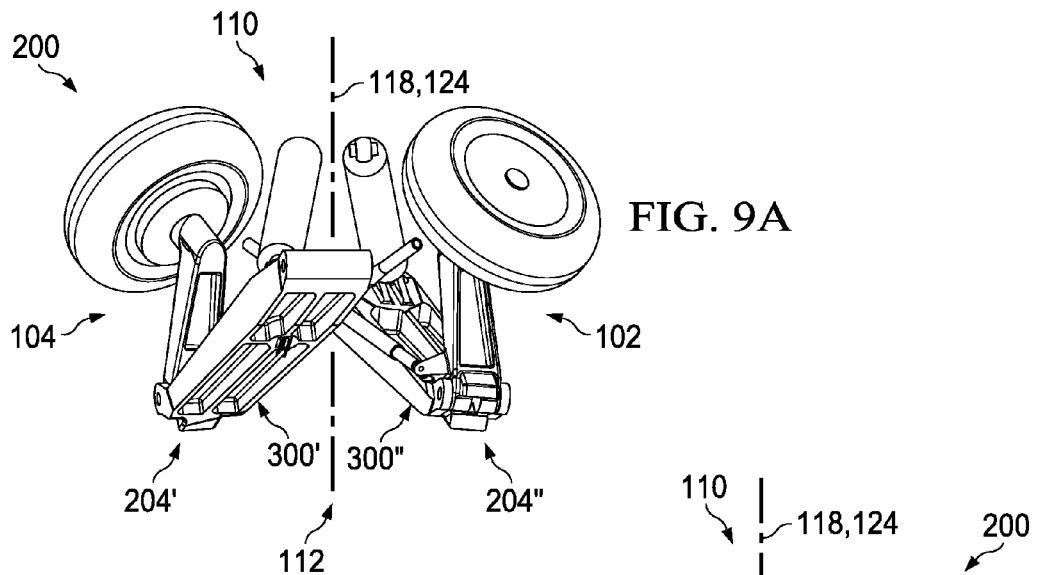
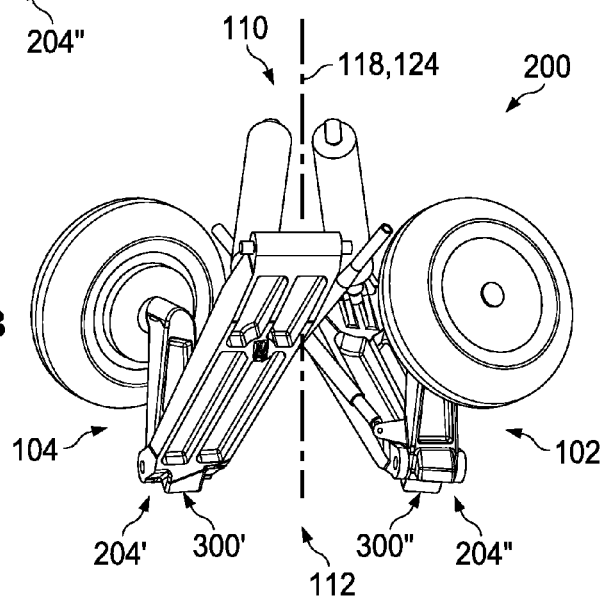
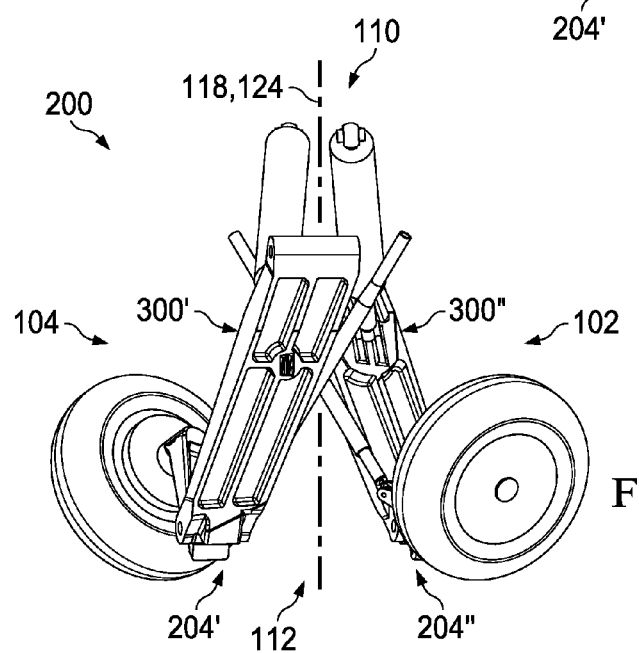

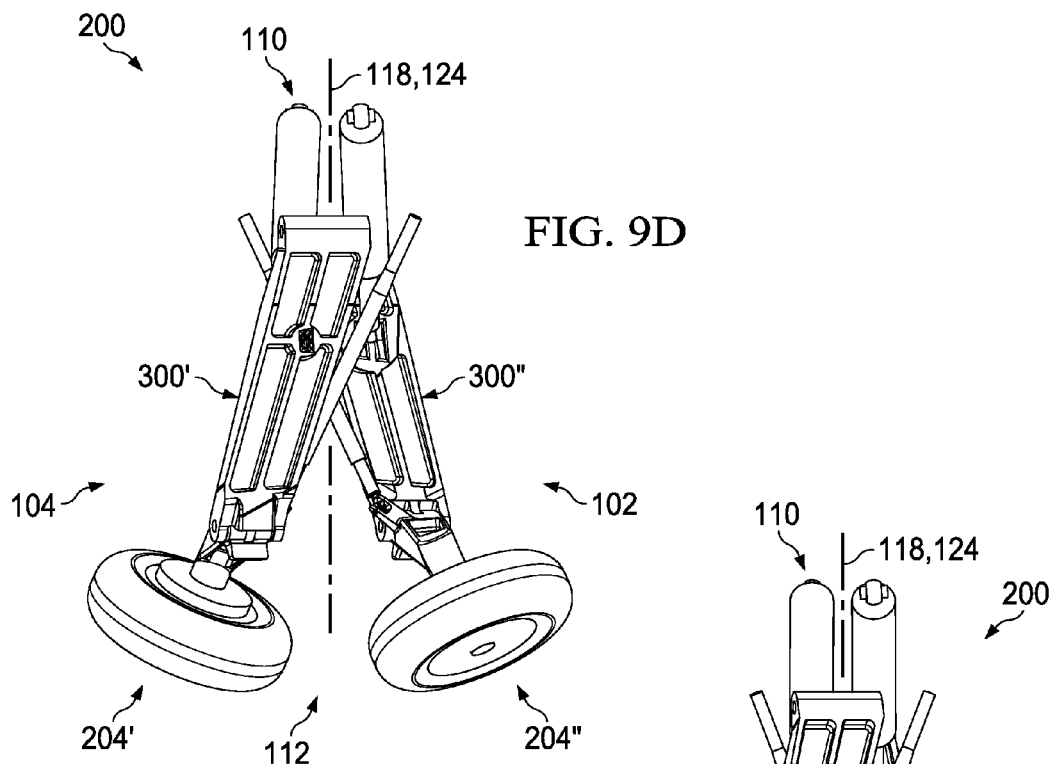
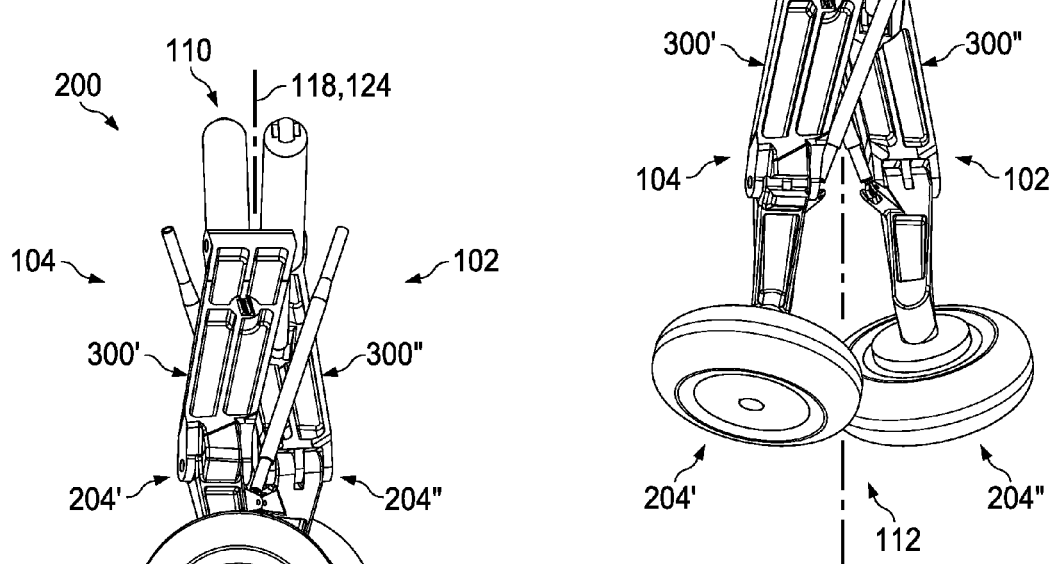

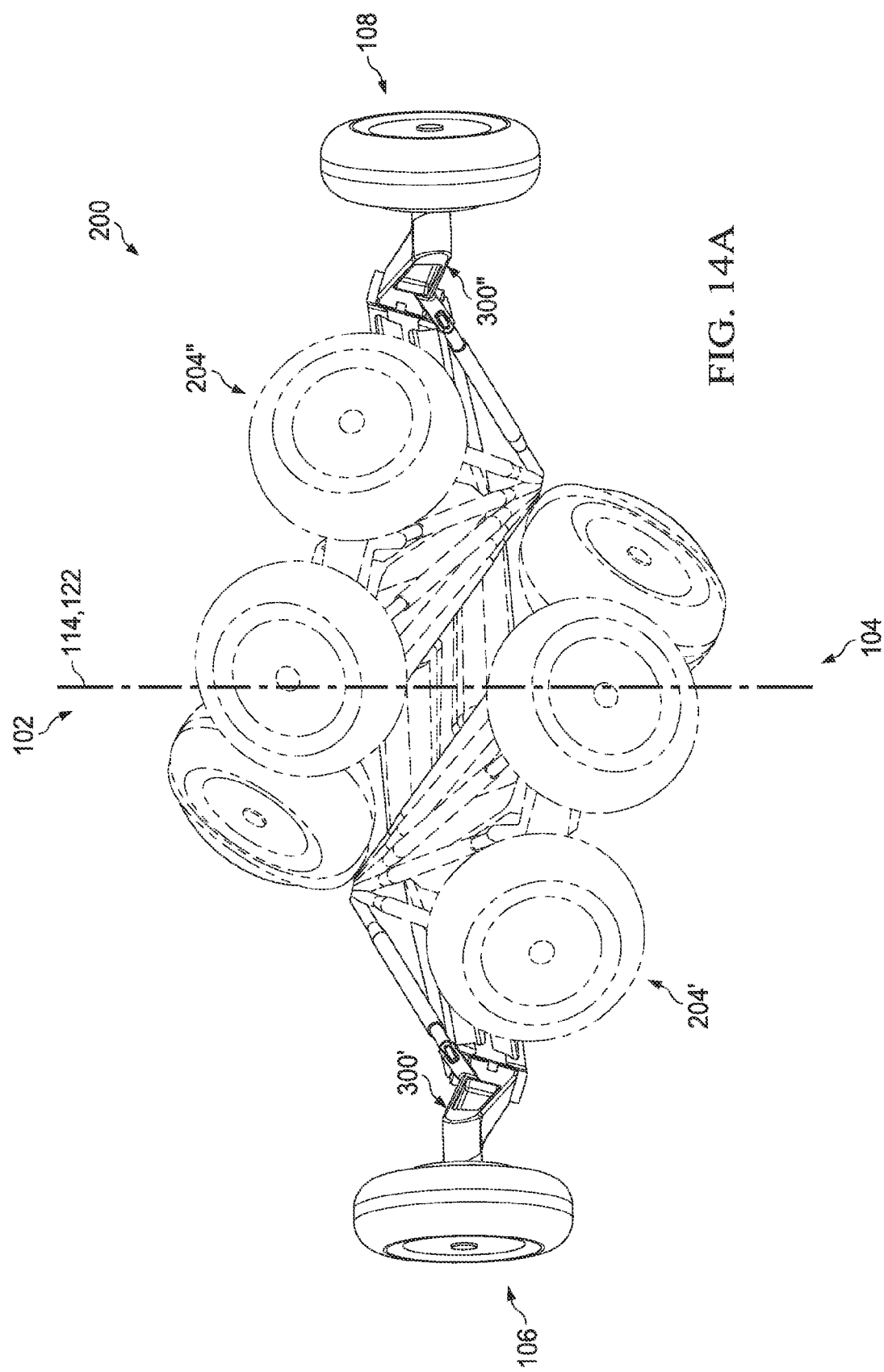

ature and the second articulated leg assembly is in the second retracted configuration.
VERTICAL SUPPORT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Retractable vertical support systems, such as retractable aircraft landing gear, may extend over a lateral maximum width while retracted that exceeds a desired lateral width. In some cases, the excessive lateral maximum width may require landing gear enclosures that protrude laterally beyond a desired fuselage lateral width. Similarly, retractable vertical support systems may extend a longitudinal maximum length while retracted that exceeds a desired longitudinal length.

SUMMARY

In some embodiments of the disclosure a vertical support system is provided that comprises: a first articulated leg assembly configured to carry a first load, the first articulated leg assembly being selectively movable between a first refracted configuration and a first loaded configuration; and a second articulated leg assembly configured to carry a second load substantially kinematically identical to the first articulated leg assembly, the second articulated leg assembly being selectively movable between a second retracted configuration and a second loaded configuration; wherein a lateral width ratio is equal to a value of less than about 0.6, the lateral width ratio being defined as a ratio of (1) a minimum lateral width between the lateral extents of the first wheel assembly and the second wheel assembly when the first articulated leg assembly is in the first retracted configuration and the second articulated leg assembly is in the second refracted configuration to (2) a maximum lateral width between the lateral extents of the first wheel assembly and the second wheel assembly when the first articulated leg assembly is in the first loaded configuration and the second articulated leg assembly is in the second loaded configuration.

In other embodiments of the disclosure, a vertical support system is provided that comprises: a first articulated leg assembly configured to carry a first load, the first articulated leg assembly being selectively movable between a first refracted configuration and a first loaded configuration; and a second articulated leg assembly configured to carry a second load substantially kinematically identical to the first articulated leg assembly, the second articulated leg assembly being selectively movable between a second retracted configuration and a second loaded configuration; wherein the first articulated leg assembly and the second articulated leg assembly are located as mirror images of each other while the first articulated leg assembly is in the first loaded configuration and the second articulated leg assembly is in the second loaded configuration; and wherein the first articulated leg assembly and the second articulated leg assembly are not located as mirror images of each other while the first articulated leg assembly is in the first retracted configuration and the second articulated leg assembly is in the second retracted configuration.

In yet other embodiments of the disclosure, a retractable vertical support system is provided that comprises: a first articulated leg assembly comprising a first primary axis of rotation and a first primary plane coincident with the first primary axis, wherein the first articulated leg assembly is selectively movable between a first extended configuration and a first retracted configuration; and a second articulated leg assembly substantially kinematically similar to the first articulated leg assembly, the second articulated leg assembly comprising a second primary axis of rotation substantially fixed relative to the first primary axis of rotation and substantially parallel to the first primary axis of rotation, the second articulated leg assembly comprising a second primary plane coincident with the second primary axis and substantially parallel to the first primary plane, wherein the second articulated leg assembly is selectively movable between a second extended configuration and a second retracted configuration; wherein when the first articulated leg assembly is in the first retracted configuration, substantially all of the first articulated leg assembly is located between the first primary plane and the second primary plane; wherein when the second articulated leg assembly is in the second retracted configuration, substantially all of the second articulated leg assembly is located between the first primary plane and the second primary plane; wherein when the first articulated leg assembly is in the first extended configuration, substantially all of the first articulated leg assembly is located exterior to the space between the first primary plane and the second primary plane; wherein when the second articulated leg assembly is in the second extended configuration, substantially all of the second articulated leg assembly is located exterior to the space between the first primary plane and the second primary plane; wherein the first articulated leg assembly extends a first extended maximum radial distance from the first primary axis of rotation when the first articulated leg assembly is in the first extended configuration, wherein the first articulated leg assembly extends a first retracted maximum radial distance from the first primary axis of rotation when the first articulated leg assembly is in the first retracted configuration, and wherein the first extended maximum radial distance is greater than the first retracted maximum radial distance; wherein the second articulated leg assembly extends a second extended maximum radial distance from the second primary axis of rotation when the second articulated leg assembly is in the second extended configuration, wherein the second articulated leg assembly extends a second retracted maximum radial distance from the second primary axis of rotation when the second articulated leg assembly is in the second retracted configuration, and wherein the second extended maximum radial distance is greater than the second retracted maximum radial distance; and wherein the distance between the first primary plane and the second primary plane is less than each of the first extended maximum radial distance and the second extended maximum radial distance.

BRIEF DESCRIPTION OF THE DRAWINGS

For a more complete understanding of the present disclosure and the advantages thereof, reference is now made to the following brief description, taken in connection with the accompanying drawings and detailed description:

FIGS. 9A-9G are orthogonal left views showing both the first retractable system and the second retractable system in retracted configurations, first extended configurations, second extended configurations, third extended configurations, fourth extended configurations, fifth extended configurations, and loaded configurations, respectively;

FIGS. 14A-14C are orthogonal bottom views of both the first retractable system and the second retractable system, the first retractable system, and the second retractable system, respectively, in each of the configurations of FIGS. 13A-13G, with the retracted configurations and loaded configurations in solid lines and intermediate configurations in broken lines.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a vertical support system, such as aircraft landing gear, that is retractable into a compact spatial envelope. In some embodiments of the disclosure, a vertical support system is provided that comprises two kinematically identical articulated leg assemblies that may be retracted and/or folded into a compact spatial envelope. In some embodiments, the compact spatial envelope may be located primarily within a fuselage of an aircraft so that a lateral width of the fuselage may be reduced and/or so that no enclosures exterior to the fuselage are needed to house the retracted vertical support system.

Figure 1:
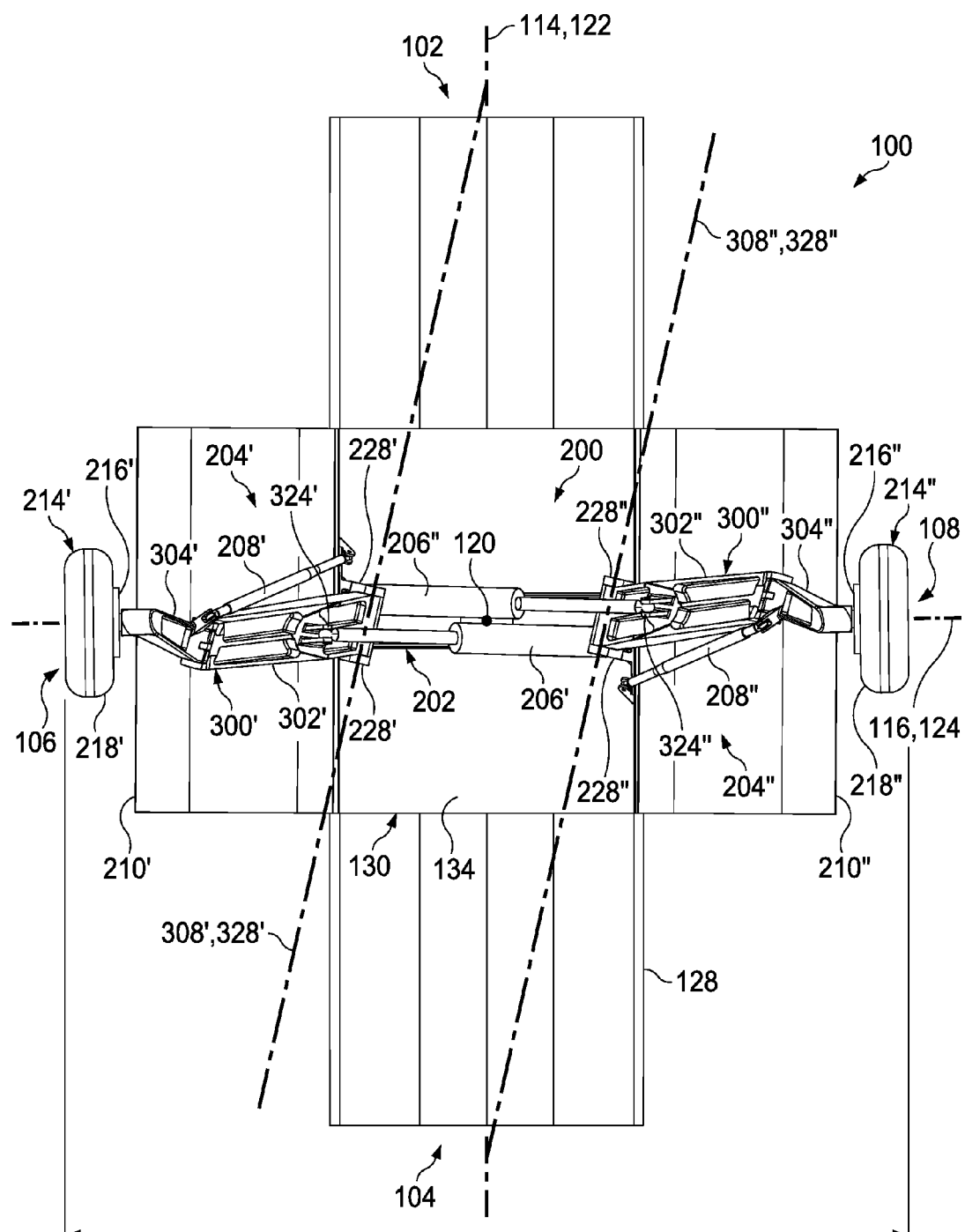
FIG. 1 is an orthogonal bottom view of a portion of an aircraft comprising a vertical support system in a loaded configuration according to an embodiment of the disclosure.
Figure 2:
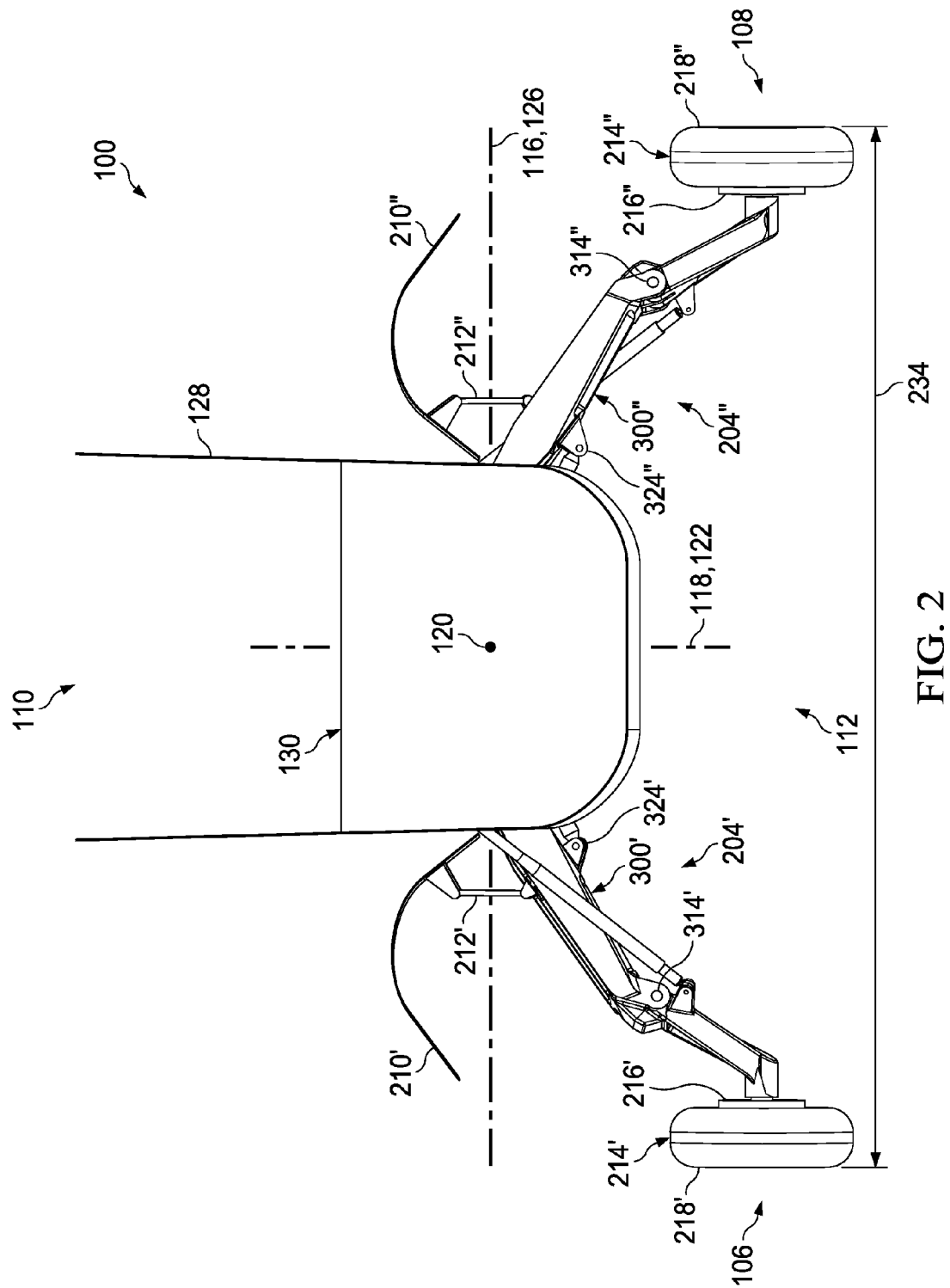
FIG. 2 is an orthogonal front view of a portion of the aircraft of FIG. 1 with the vertical support system in a loaded configuration.
Figure 3:
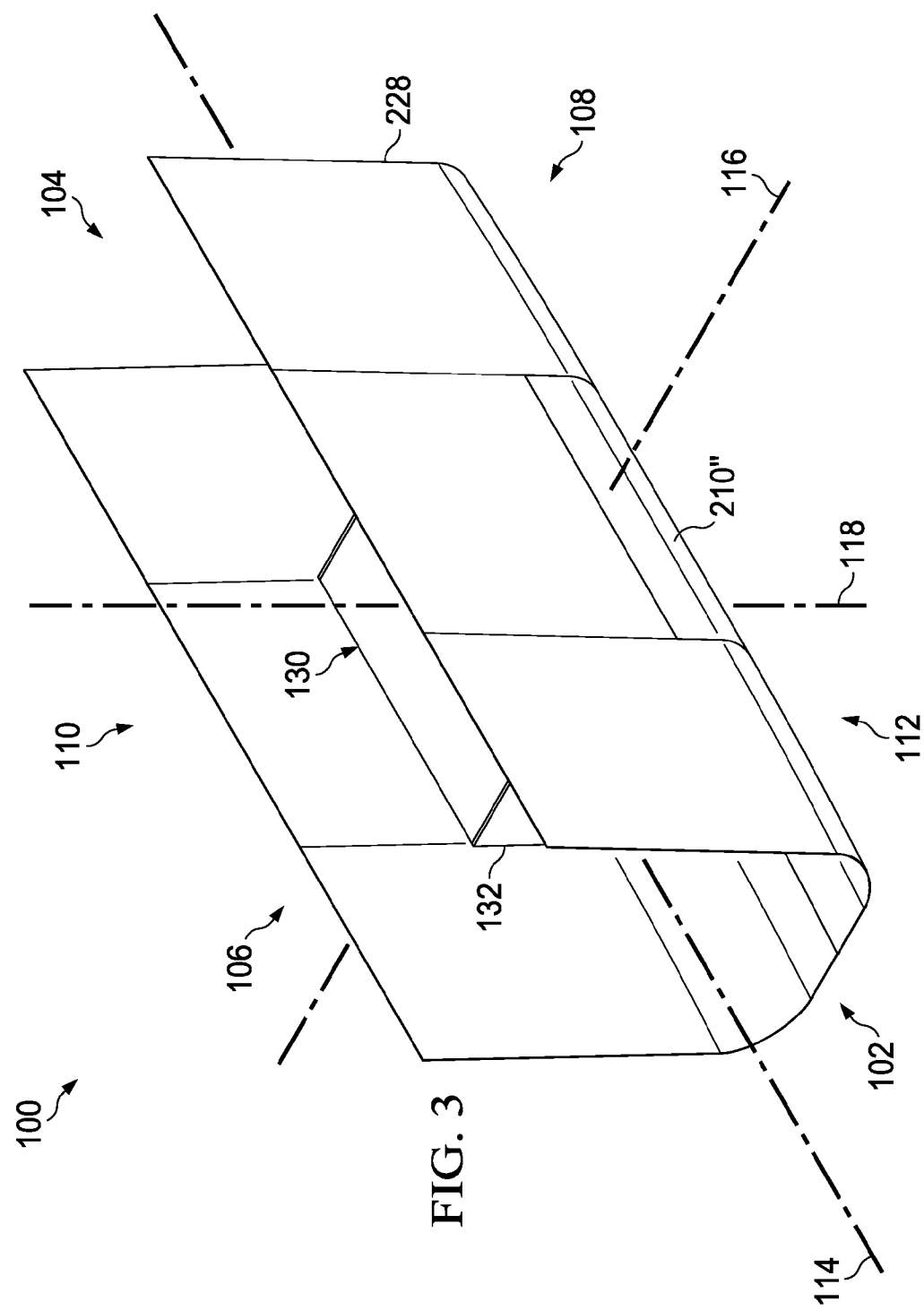
FIG. 3 is an oblique view of a portion of the aircraft of FIG. 1 with the vertical support system in a retracted configuration.

Referring to FIGS. 1-3, a portion of an aircraft 100 according to an embodiment of the disclosure is shown. Aircraft 100 may be described as generally comprising a front 102, rear 104, left 106, right 108, top 110, and bottom 112 and the following description and associated drawings may generally utilize directional indications to assist in identifying the directional orientation of the aircraft 100 and/or components of the aircraft 100 without the requirement that such an indication is an absolute identification of a directional extent of the aircraft 100. In other words, the above described directional indications are intended to generally clarify orientations of the components of the aircraft 100 relative to each other and to provide context to the associated figures. The same directional indicators are utilized in the discussion and associated figures that comprise the aircraft 100 and/or components of the aircraft 100 to provide a consistent frame of reference throughout the disclosure.

The aircraft 100 further comprises a longitudinal axis 114, a lateral axis 116, and a vertical axis 118. The lateral axis 116 generally extends longitudinally in a front-rear direction relative to the aircraft 100. The longitudinal axis 114 generally extends laterally in a left-right direction relative to the aircraft 100. The vertical axis 118 generally extends vertically in a top-bottom direction relative to the aircraft 100. The longitudinal axis 114, lateral axis 116, and vertical axis 118 intersect each other at an origin 120 and may generally be described as defining a three dimensional Cartesian coordinate system. The aircraft 100 further comprises a lateral bisection plane 122, a longitudinal bisection plane 124, and a vertical bisection plane 126. The lateral bisection plane 122 is generally coincident with the longitudinal axis 114 and the vertical axis 118. The longitudinal bisection plane 124 is generally coincident with the lateral axis 116 and the vertical axis 118. The vertical bisection plane 126 is generally coincident with the lateral axis 116 and longitudinal axis 114.

While the axes 114, 116, and 118 and bisection planes 122, 124, and 126 are generally defined to reflect a traditional aircraft coordinate system, the location of the origin 120 relative to the aircraft 100 and the orientation of the axes 114, 116, and 118 relative to the aircraft 100 and/or to a primary direction of forward movement of the aircraft 100 may be described differently without impact to the functionality of the aircraft 100 and/or the components of the aircraft 100 disclosed herein. In other words, unless otherwise noted herein, the defined orientations of the axes 114, 116, and 118 and bisection planes 122, 124, and 126 are provided as a frame of reference against which the aircraft 100 and the components of the aircraft 100 may be consistently described.

Referring now to FIGS. 1 and 2, FIG. 1 is an orthogonal bottom view of a portion of the aircraft 100 and FIG. 2 is an orthogonal front view of the same portion of the aircraft 100. The aircraft 100 generally comprises a fuselage 128 that comprises a bay 130 generally defined by bay walls 132 that generally bound a bay space 134. The aircraft 100 further comprises a vertical support system 200 configured to selectively vertically support at least a portion of the aircraft 100, a component of the aircraft 100, and/or an object at least partially carried by the aircraft 100. In alternative embodiments, the fuselage 128 may comprise no bay 130, the bay 130 may be differently shaped, and/or the bay space 134 may be otherwise defined as a portion of an aircraft other than the fuselage 128. Regardless the shape, size, and/or location of the bay 130, the bay space 134 is configured to selectively allow ingress of at least a portion of the vertical support system 200 into the bay space 134 and/or egress of at least a portion of the vertical support system 200 out of the bay space 134.

The vertical support system 200 may be referred to as a landing gear system and/or other weight bearing support system. The vertical support system 200 generally comprises a structural support 202 and two retractable systems 204', 204" connected to the support 202. As explained herein, in some embodiments, the similarities between the retractable systems 204', 204", physically, spatially, and/or kinematically, allow for the use of the reference number modifier, ', or a "prime symbol," to denote a first and/or left side system or component while the use of the reference number modifier, ", or a "double prime symbol," denotes a second and/or right side system or component. The retractable systems 204', 204" may generally comprise components configured to enable selective retraction movements and extension movements that increase and decrease, respectively, an amount of the retractable systems 204', 204" located within the bay space 134. In the embodiment shown, the retractable system 204" comprises substantially identical components to the components of the retractable system 204'. Accordingly, in the embodiment shown, the retractable system 204" is also substantially kinematically identical to the retractable system 204'. For example, in the embodiment shown, any of the components of the retractable system 204' may be supplanted for use of the related component of the retractable system 204" without changing the shape, size, structure, functionality, and/or kinematic behavior of the retractable system 204".

The retractable system 204' and the retractable system 204" may not be complete mirror images of each other about the lateral bisection plane 122. In the embodiment shown, identical components of the retractable system 204' and retractable system 204" are vertically aligned with each other. Further, the retractable system 204" is laterally located relative to the lateral bisection plane 122, as viewed from the rear, in the same way the retractable system 204' is laterally located relative the lateral bisection plane 122, as viewed from the front. Similarly, the retractable system 204" is longitudinally located relative to the longitudinal bisection plane 124, as viewed from the right, in the same way the retractable system 204' is longitudinally located relative the longitudinal bisection plane 124, as viewed from the left. While the retractable system 204' and the retractable system 204" are identical both physically and kinematically in this embodiment, alternative embodiments may comprise physical differences between components and/or kinematic differences between the retractable system 204' and the retractable system 204".

Still referring to FIGS. 1 and 2, the retractable system 204 comprises an articulated leg assembly 300 and components for kinematically restraining and selectively causing movement of the articulated leg assembly 300. The articulated leg assembly 300 generally comprises an upper leg 302 movably connected to the structural support 202 and a lower leg 304 movably connected to the upper leg 302. The retractable system 204 further comprises an actuator 206, a lower linkage 208, a bay door 210, a door linkage 212, and a wheel assembly 214. In some alternative embodiments, the wheel assembly 214 may comprise a tricycle type wheel assembly. The actuator 206 is selectively controllable to vary in length and is connected between the structural support 202 and the upper leg 302. In some embodiments, the actuator 206 may additionally serve to provide primary shock absorption and/or damping of applied loads, such as, but not limited to, landing loads. The lower linkage 208 controls the movement of the lower leg 304 relative to the upper leg 302 and comprises a compressible feature and is connected between the structural support 202 and the lower leg 304. The bay door 210 may be hinged to the fuselage 128 to selectively enclose the bay space 134. The door linkage 212 is connected between the upper leg 302 and the bay door 210. The wheel assembly 214 is generally carried by the lower leg 304 and comprises a brake 216 and a tire 218.

Most generally, the vertical support system 200 is operable to selectively move the retractable system 204 between a retracted configuration and an extended configuration. In the retracted configuration, the vertical support system 200 may comprise a greatly reduced maximum lateral width as compared to the maximum lateral width of the vertical support system 200 in an extended configuration. The retracted configuration may be a configuration in which the vertical support system 200 is selectively stowed when not configured for vertically supporting at least a portion of the aircraft 100, a component of the aircraft 100, and/or an object at least partially carried by the aircraft 100. In some embodiments, the vertical support system 200 may require no sponsons or other structures that laterally protrude beyond the fuselage 128 to receive the retracted vertical support system 200. In some embodiments, the above-described retraction capability may provide a more stealth aircraft 100, a reduced radar signature of the aircraft 100, and/or a reduction in aerodynamic drag of the aircraft 100.

The extended configuration may be a configuration in which the vertical support system 200 is selectively deployed when configured for vertically supporting at least a portion of the aircraft 100, a component of the aircraft 100, and/or an object at least partially carried by the aircraft 100. It will be appreciated that while the retracted configuration and extended configuration may represent configurations near opposing ends of a continuous spectrum of possible configurations, in some embodiments, the retracted configuration and the extended configuration may not represent the most retracted configuration and the most extended configuration, but rather, may represent a desired retracted configuration and desired extended configuration around which some features and/or functionality of the vertical support system 200 are designed.

Still referring to FIGS. 1 and 2, vertical support system 200 is shown with the retractable systems 204 in a loaded configuration. The loaded configuration comprises the retractable system 204 being extended to the extended configuration and then loaded with weight of at least a portion of the aircraft 100, a component of the aircraft 100, and/or an object at least partially carried by the aircraft 100. In this embodiment, the vertical support system 200 is generally designed so that when the vertical support system 200 is loaded with an appropriate apportionment of aircraft related weight, the tires 218', 218" substantially mirror each other's lateral and longitudinal locations. When the aircraft related weight is greater than or less than that described above and/or when the vertical support system 200 is under additional impact loads or reduced loads, the tires 218, 218" may not reach and/or maintain the above-described lateral and/or longitudinal mirroring.

Referring now to FIG. 3, an oblique view of the portion of the aircraft 100 is shown with the vertical support system 200 in a retracted configuration and with the bay doors 210', 210" closed. In this embodiment, the entirety of the retractable systems 204', 204" are housed within the bay space 134.

Figure 4:
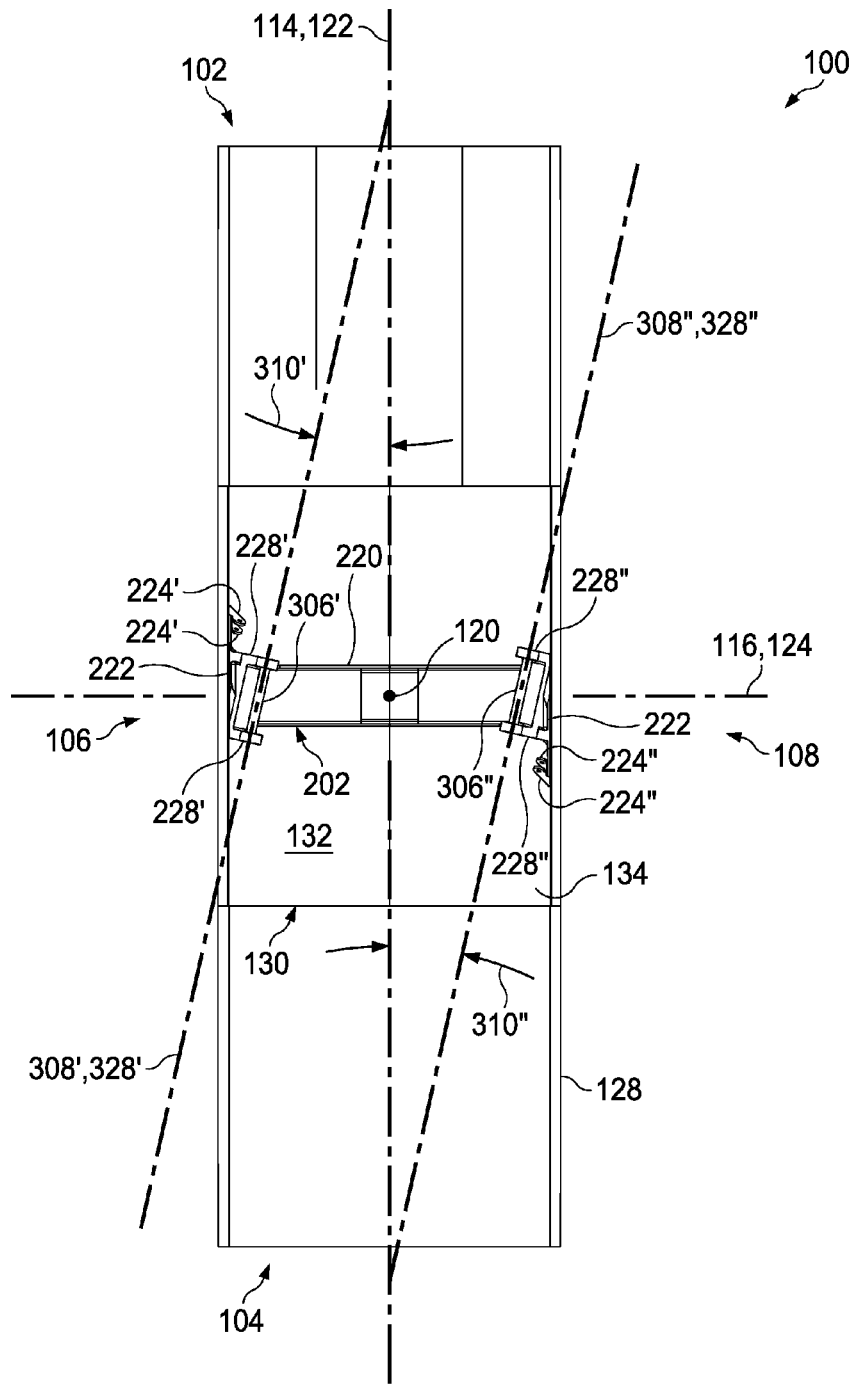
FIG. 4 is an orthogonal bottom view of a portion of the aircraft of FIG. 1 showing a support of the vertical support system.

Referring now to FIG. 4, an orthogonal bottom view of the portion of the aircraft 100 is shown with all but the structural support 202 of the vertical support system 200 removed. The structural support 202 generally comprises a laterally extending brace 220, two vertically downward extending arms 222, two sets of lower linkage upper standoffs 224, two sets of upper actuator standoffs, and two sets of upper leg standoffs 228. The arms 222 generally extend down from the lateral ends of the brace 220. Each of the arms 222 generally carries a set of the lower linkage upper standoffs 224 and a set of the upper leg standoffs 228. The lower linkage upper standoffs 224 and the upper leg standoffs 228 generally protrude toward the lateral bisection plane 122 and generally comprise plate-like structures with through holes for accepting associated pins and/or fasteners. The holes of the set of upper leg standoffs 228 are generally coaxial and are configured to receive a complementary primary pin 306. In this embodiment, the holes of the set of upper leg standoffs 228 and the primary pin 306 are each coaxial with a primary axis of rotation 308 about which the upper leg 302 may rotate as described herein. The primary axes of rotation 308', 308" are substantially parallel to each other and intersect the lateral bisection plane 122 at a primary axis longitudinal incidence angle 310. In this embodiment, the primary axis longitudinal incidence angle 310 may be equal a value in a range of about 0 degrees to about 24 degrees, about 6 degrees to about 18 degrees, about 10 degrees to about 14 degrees, or equal to about 12 degrees. The lower linkage upper standoffs 224 similarly comprise plate-like structures with through holes for accepting pins and/or fasteners about which the lower linkage 208 may rotate. In this embodiment, the upper actuator standoffs are laterally opposite the upper leg standoffs 228, are located near the intersection of the brace 220 and the arm 222, and are vertically higher than the upper leg standoffs 228. The upper actuator standoffs similarly comprise plate-like structures comprising through holes configured for accepting pins and/or fasteners about which the actuator 206 may rotate.

Still referring to FIGS. 1-4, the upper leg 302 generally comprises a proximal end configured for attachment to the upper leg standoffs 228 through the use of the primary pin 306 (see FIG. 4). In this embodiment, the upper leg 302 generally extends from the primary axis of rotation 308 at an upper leg offset angle 312 (see FIG. 13G) equal to a value in a range of about 50 degrees to about 90 degrees, about 60 degrees to about 80 degrees, about 69.2 degrees to about 73.2 degrees, or equal to about 71.2 degrees relative to the primary axis of rotation 308 as viewed from below. The upper leg 302 generally terminates at a distal end configured for attachment to a proximal end of the lower leg 304. In this embodiment, the upper leg 302 and the lower leg 304 each comprise coaxial through holes configured to receive a secondary pin 314. The through holes of the distal end of the upper leg 302, the through holes of the proximal end of the lower leg 304, and the secondary pin 314 are coaxially aligned with a secondary axis of rotation 316 about which the lower leg 304 may rotate. In this embodiment, the secondary axis of rotation 316 generally intersects the lateral bisection plane 122 at a secondary axis longitudinal incidence angle 318 (see FIGS. 11G and 13G). In this embodiment, the secondary axis longitudinal incidence angle 318 may be equal to a value in the range of about 0 degrees to about 30 degrees, about 10 degrees to about 20 degrees, about 13.7 degrees to about 17.7 degrees, or equal to about 15.7 degrees as viewed from below. In this embodiment, the lower leg 304 generally extends from the secondary axis of rotation 316 at a lower leg offset angle 320 (see FIGS. 11G and 13G) relative to the secondary axis of rotation 316. In this embodiment, the lower leg offset angle 320 may be equal to a value in a range of about 70 degrees to about 90 degrees, about 75 degrees to about 88 degrees, about 81.5 degrees to about 85.5 degrees, or equal to a value of about 83.5 degrees as viewed from below. Further, a wheel assembly axis of rotation 230 may generally be orthogonal to the lateral bisection plane 122 as viewed from below when the retractable system 204 is in the loaded configuration. Still further, while the primary axis of rotation 308 is substantially parallel to the vertical bisection plane 126 as viewed from the left, the secondary axis of rotation 316 generally intersects the vertical bisection plane 126 at a secondary axis vertical incidence angle 322 as viewed from the left. In this embodiment, the secondary axis vertical incidence angle 322 may be equal to a value in a range of about 0 degrees to about 8 degrees, about 1 degree to about 7 degrees, about 2 degrees to about 6 degrees, or equal to a value of about 4 degrees as viewed from the left.

Referring again to FIGS. 1 and 2, the upper leg 302 comprises lower actuator standoffs 324 configured to receive a pin and/or other fasteners to provide a movable connection between the actuator 206 and the upper leg 302. Similarly, the lower leg 304 comprises lower linkage lower standoffs 326 configured to receive a pin and/or other fasteners to provide a movable connection between the lower linkage 208 and the lower leg 304. Because the actuator 206 comprises a selectively variable length between the upper actuator standoffs of the structural support 202 and the lower actuator standoffs 324 of the upper leg 302, retractable system 204 may be variably controlled over a range of configurations generally between the retracted configuration of FIG. 3 and the loaded configuration of FIGS. 1 and 2.

Figure 5A:
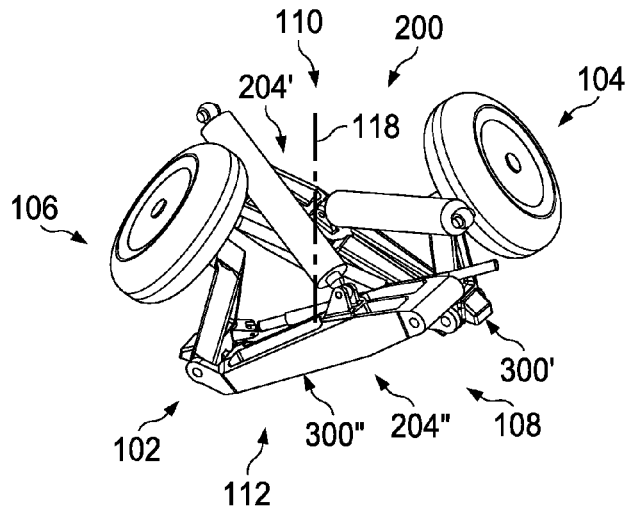
FIGS. 5A-5G are oblique views showing both a first retractable system of the vertical support system of FIG. 1 and a second retractable system of the vertical support system of FIG. 1 in retracted configurations, first extended configurations, second extended configurations, third extended configurations, fourth extended configurations, fifth extended configurations, and loaded configurations, respectively.
Figure 5B:
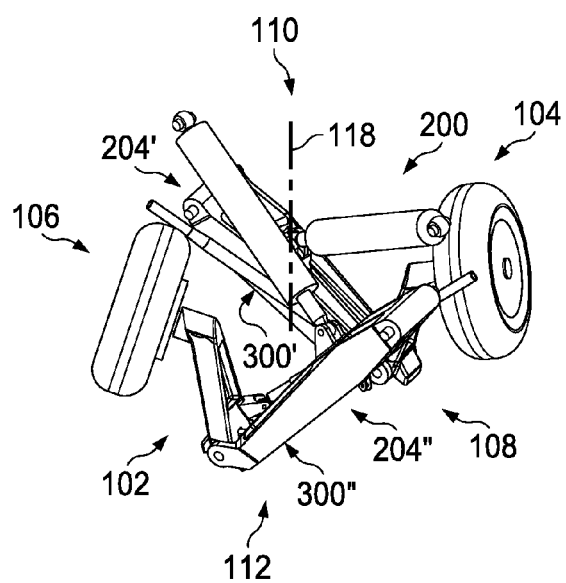
Figure 5C:
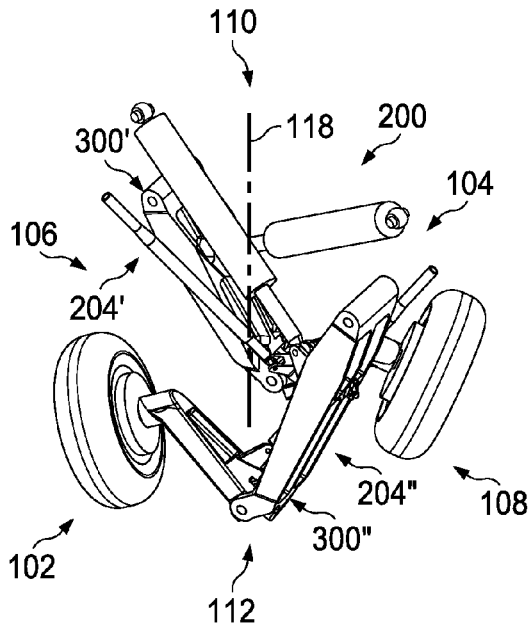
Figure 5D:
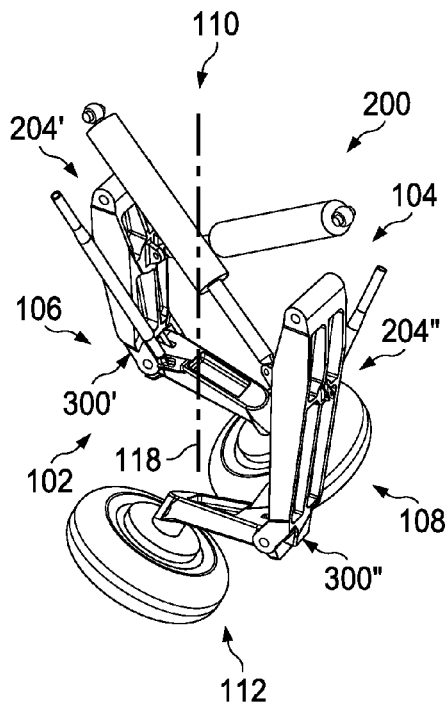
Figure 5E:
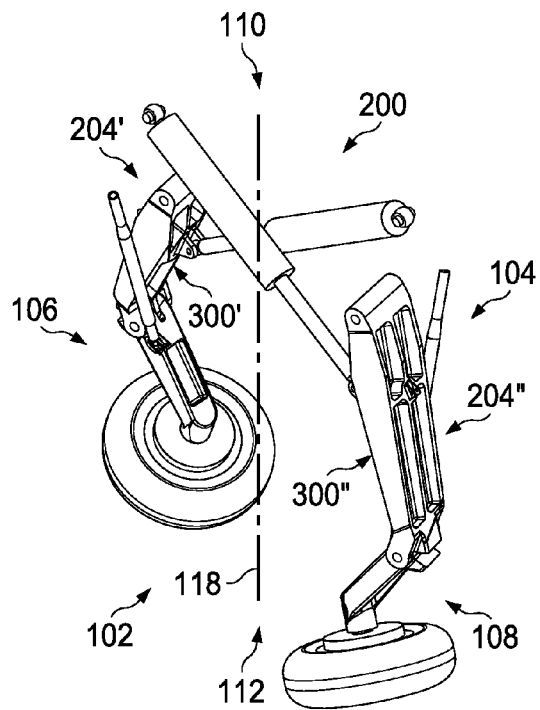
Figure 5F:
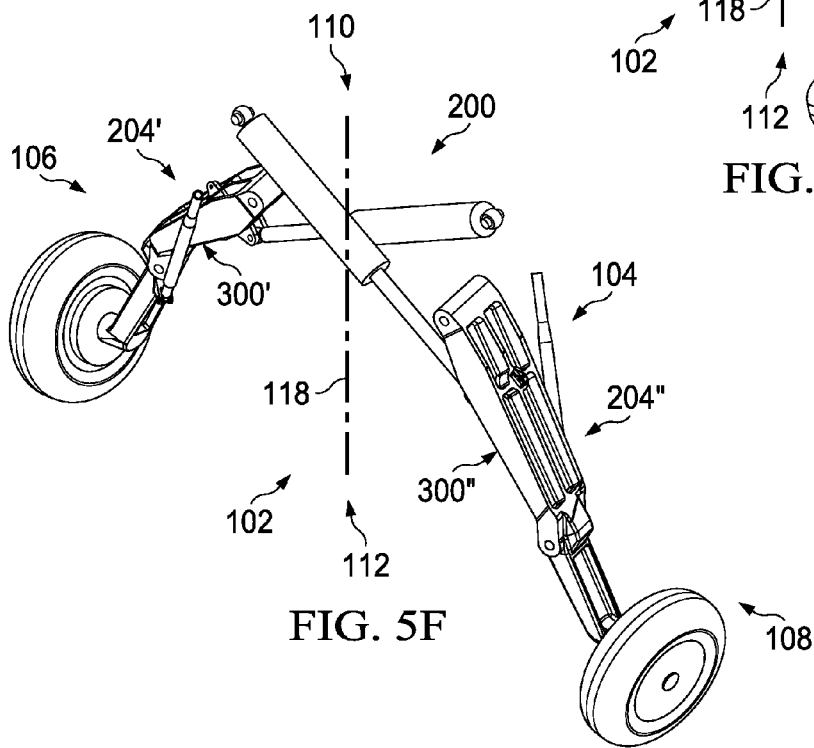
Figure 5G:
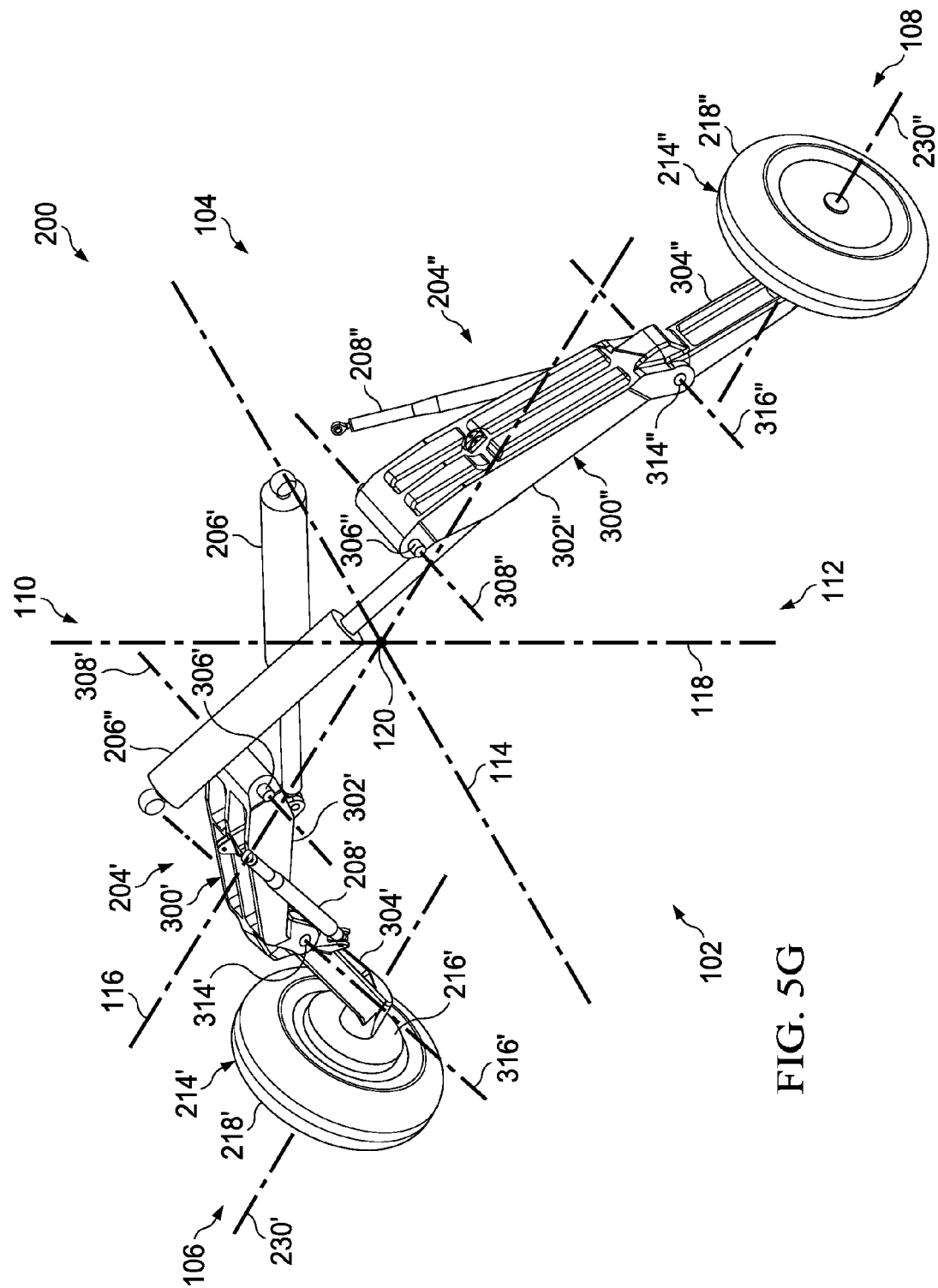

Referring now to FIGS. 5A-5G, a series of oblique views of the retractable systems 204', 204" are shown in a retracted configuration (FIG. 5A), a plurality of intermediate configurations in order of increasing stages of extension (FIGS. 5B-5E), an extended configuration (FIG. 5F), and a loaded configuration (FIG. 5G).

Figure 6A:
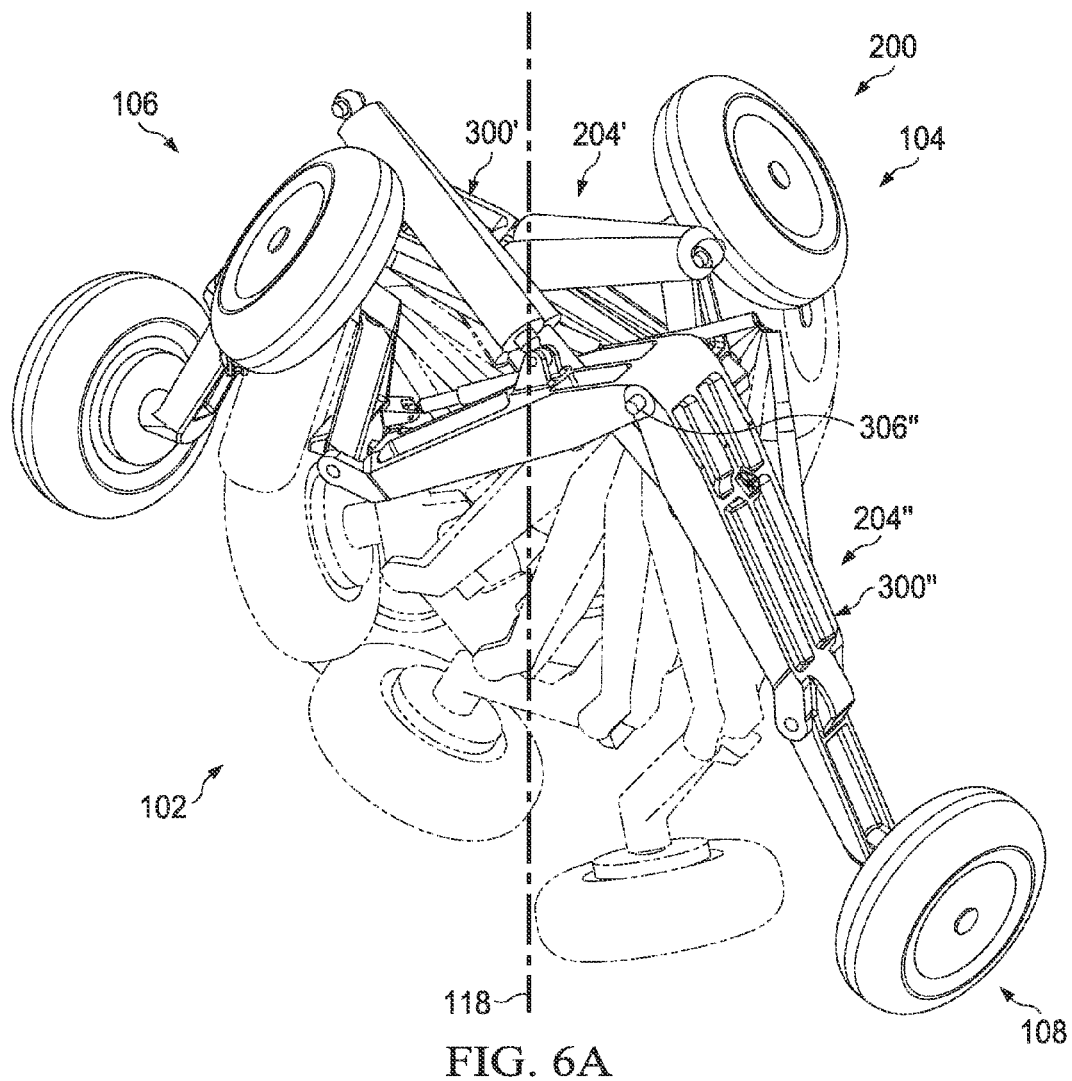
FIGS. 6A-6C are oblique views of both the first retractable system and the second retractable system, the first retractable system, and the second retractable system, respectively, in each of the configurations of FIGS. 5A-5G, with the retracted configurations and loaded configurations in solid lines and intermediate configurations in broken lines.
Figure 6B:
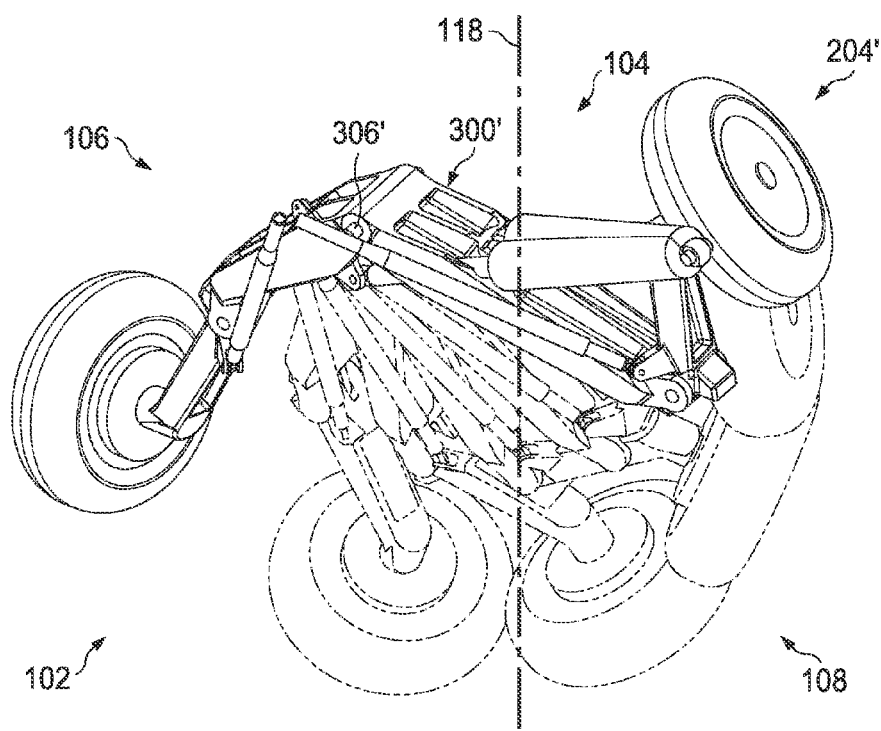
Figure 6C:
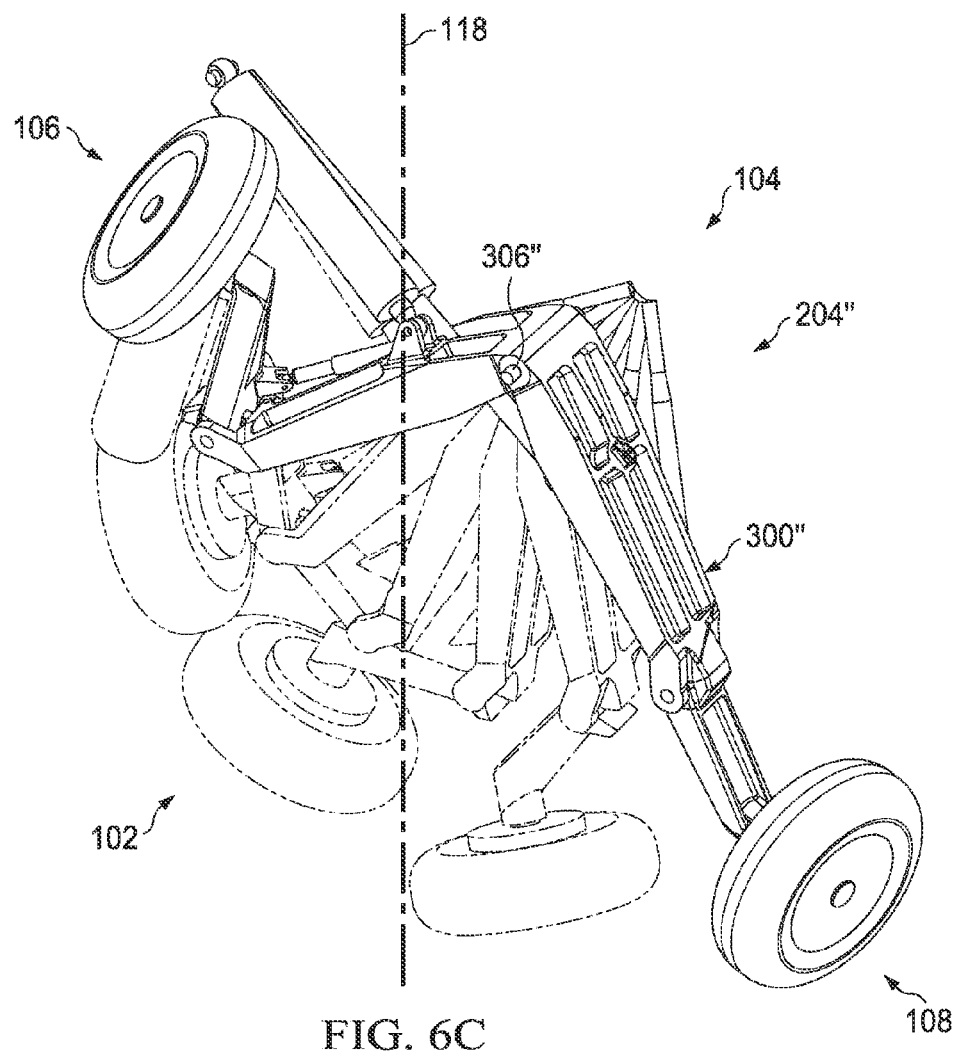

Referring now to FIG. 6A, an oblique bloom display of the retractable systems 204', 204" in each of the configurations of FIGS. 5A-5F and with the various configurations spatially overlapping each other is shown. Referring now to FIG. 6B, an oblique bloom display of the retractable system 204' in each of the configurations of FIGS. 5A-5F and with the various configurations spatially overlapping each other is shown. Referring now to FIG. 6C, an oblique bloom display of the retractable system 204" in each of the configurations of FIGS. 5A-5F and with the various configurations spatially overlapping each other is shown.

Figure 7A:
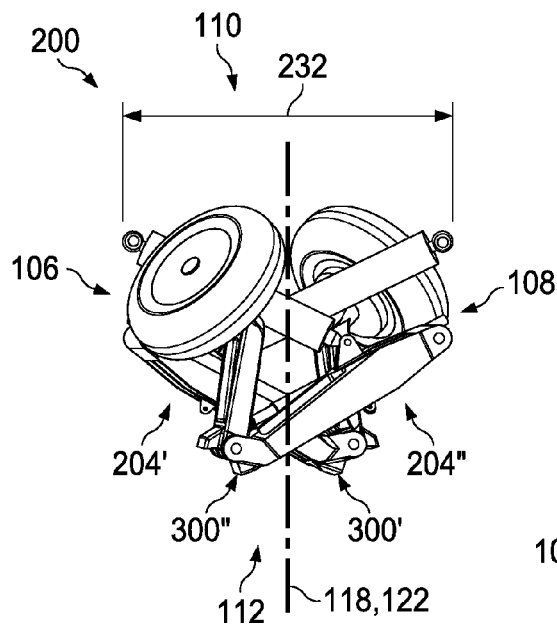
FIGS. 7A-7G are orthogonal front views showing both the first retractable system and the second retractable system in retracted configurations, first extended configurations, second extended configurations, third extended configurations, fourth extended configurations, fifth extended configurations, and loaded configurations, respectively.
Figure 7B:
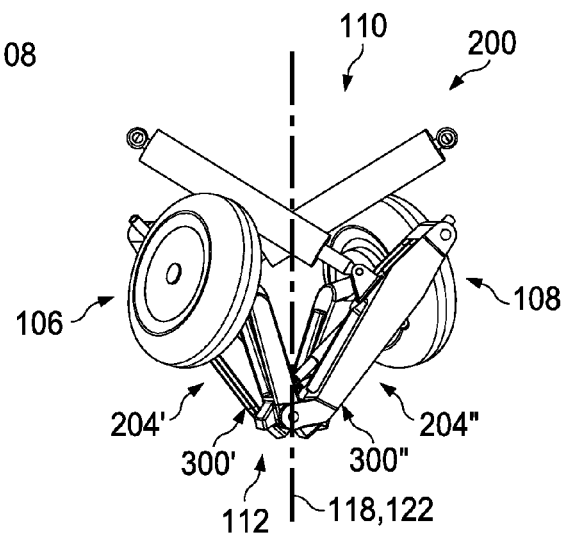
Figure 7C:
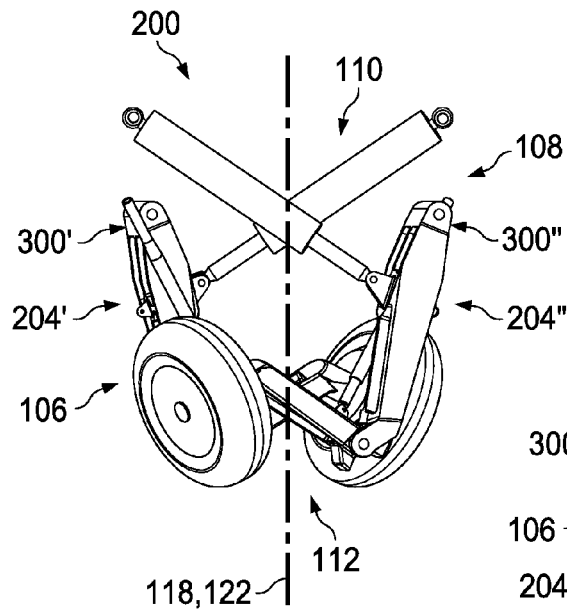
Figure 7D:
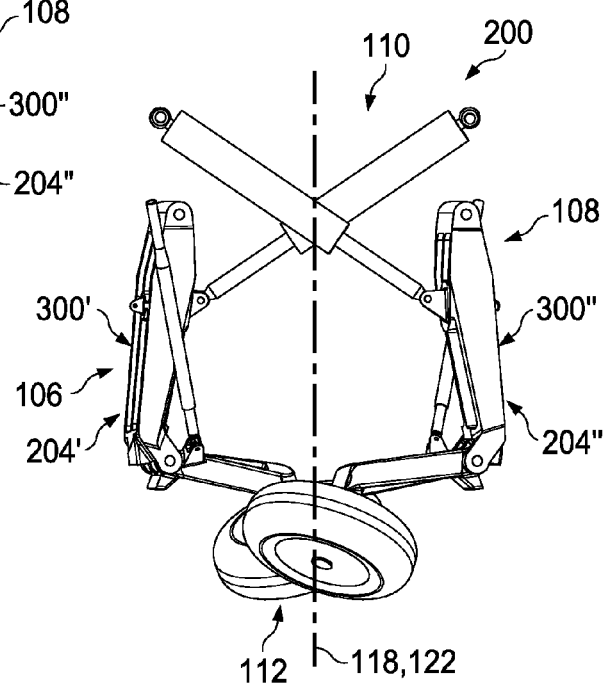
Figure 7E:
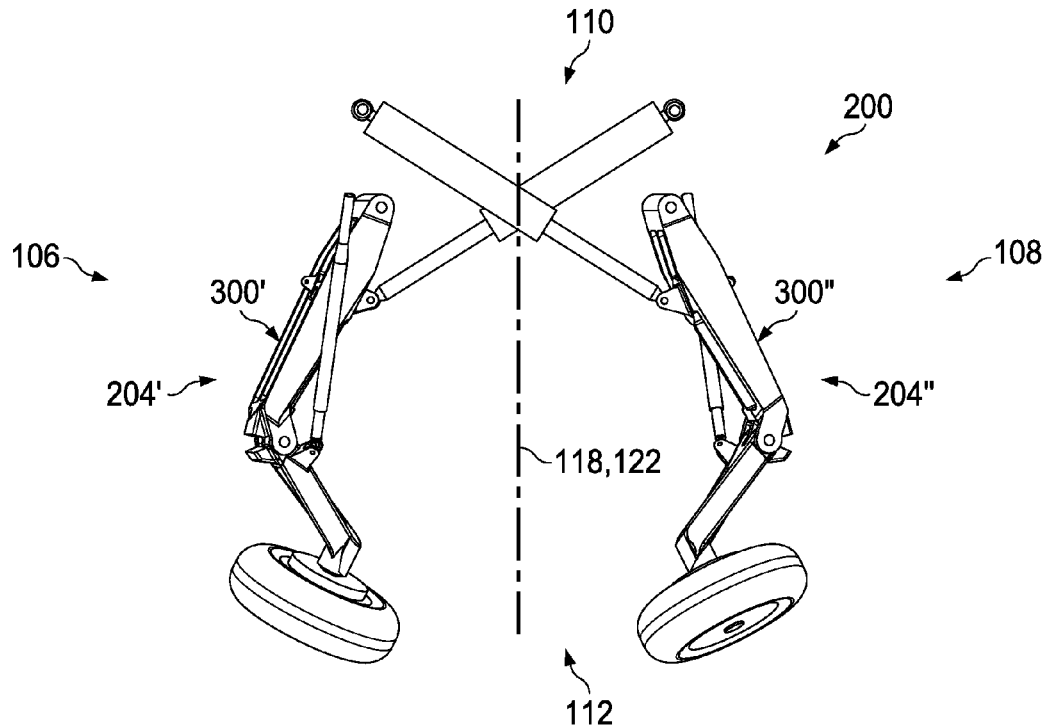
Figure 7F:
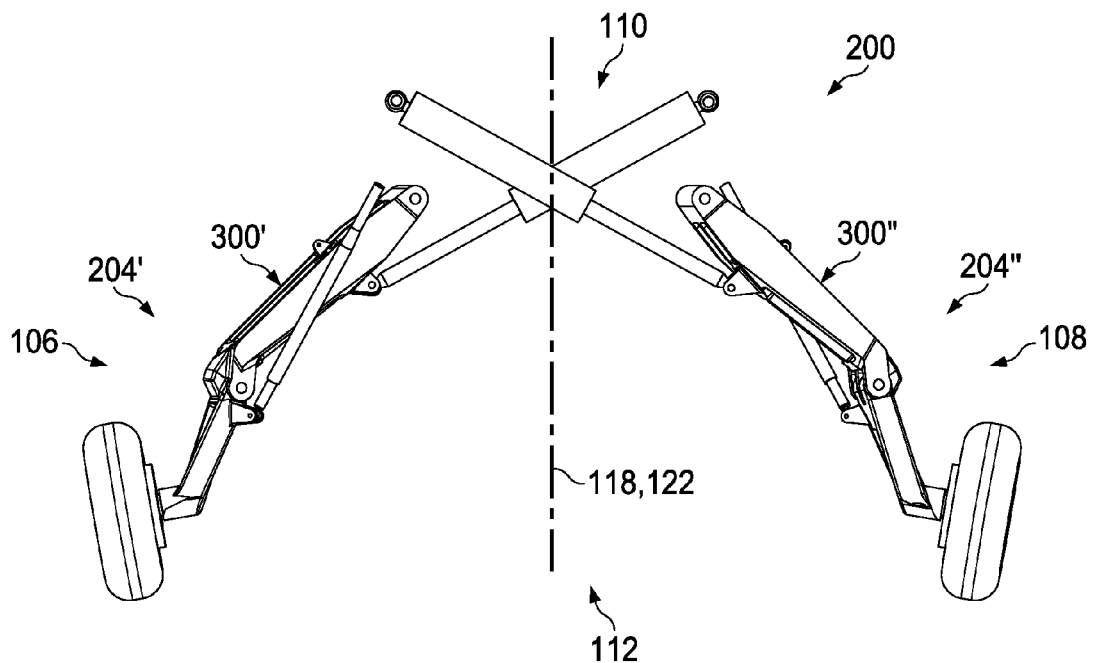
Figure 7G:
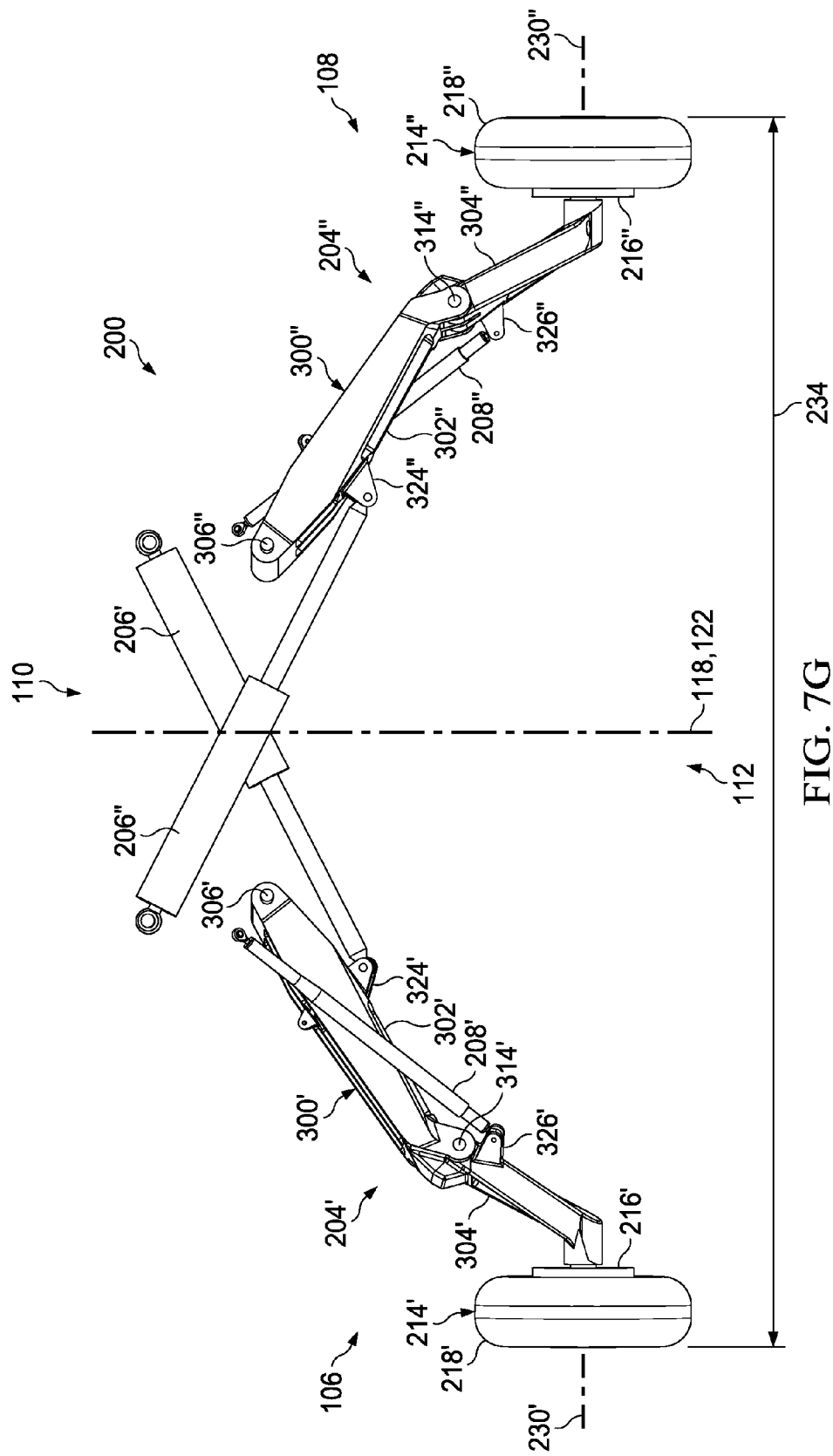

Referring now to FIGS. 7A-7G, a series of orthogonal front views of the retractable systems 204', 204" are shown in a retracted configuration (FIG. 7A), a plurality of intermediate configurations in order of increasing stages of extension (FIGS. 7B-7E), an extended configuration (FIG. 7F), and a loaded configuration (FIG. 7G). It will be appreciated that, in this embodiment, the orthogonal rear views of the retractable systems 204 are not provided because they would be identical to orthogonal front views of the retractable systems 204.

Figure 8A:
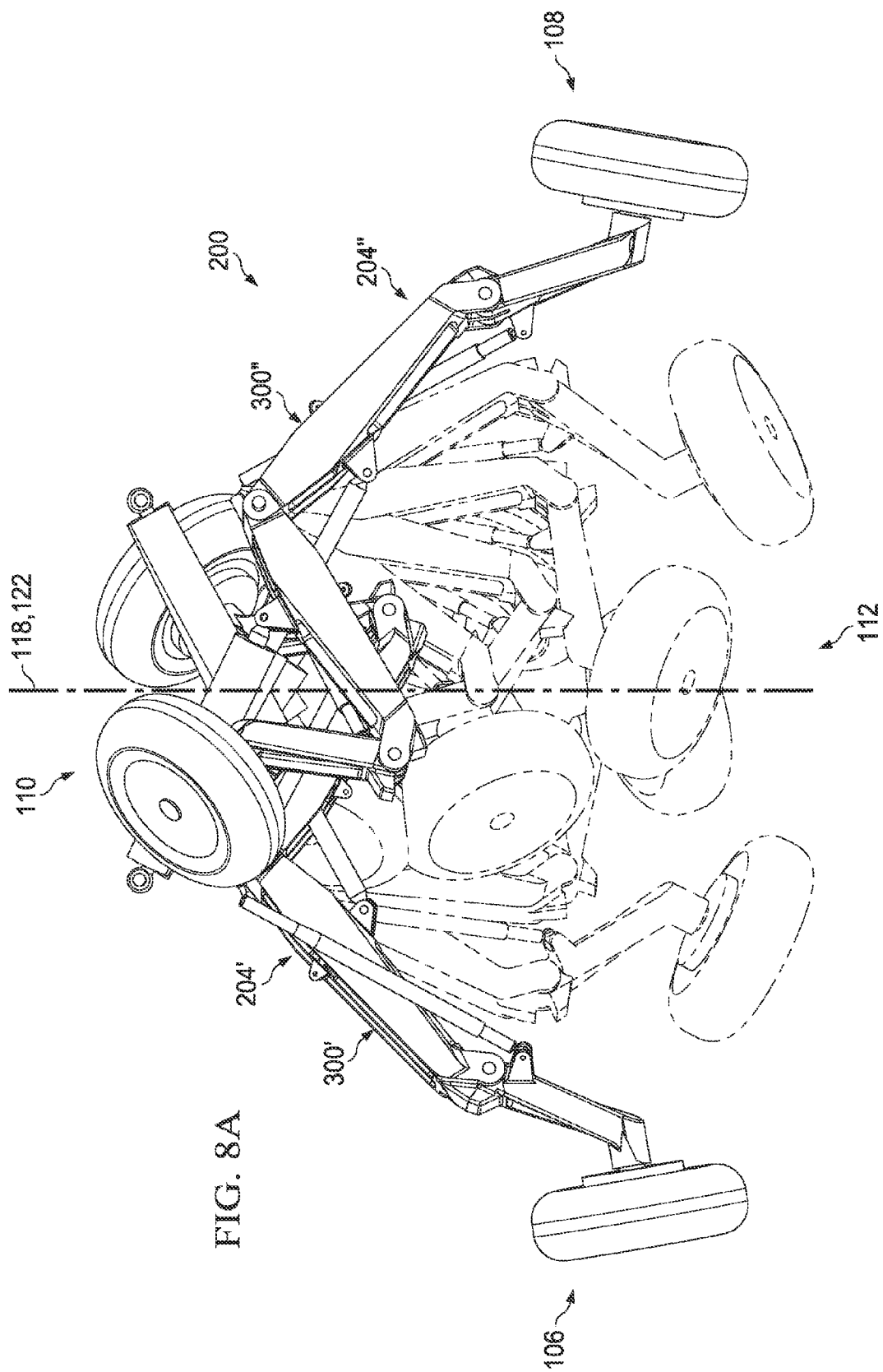
FIGS. 8A-8C are orthogonal front views of both the first retractable system and the second retractable system, the first retractable system, and the second retractable system, respectively, in each of the configurations of FIGS. 7A-7G, with the retracted configurations and loaded configurations in solid lines and intermediate configurations in broken lines.
Figure 8B:
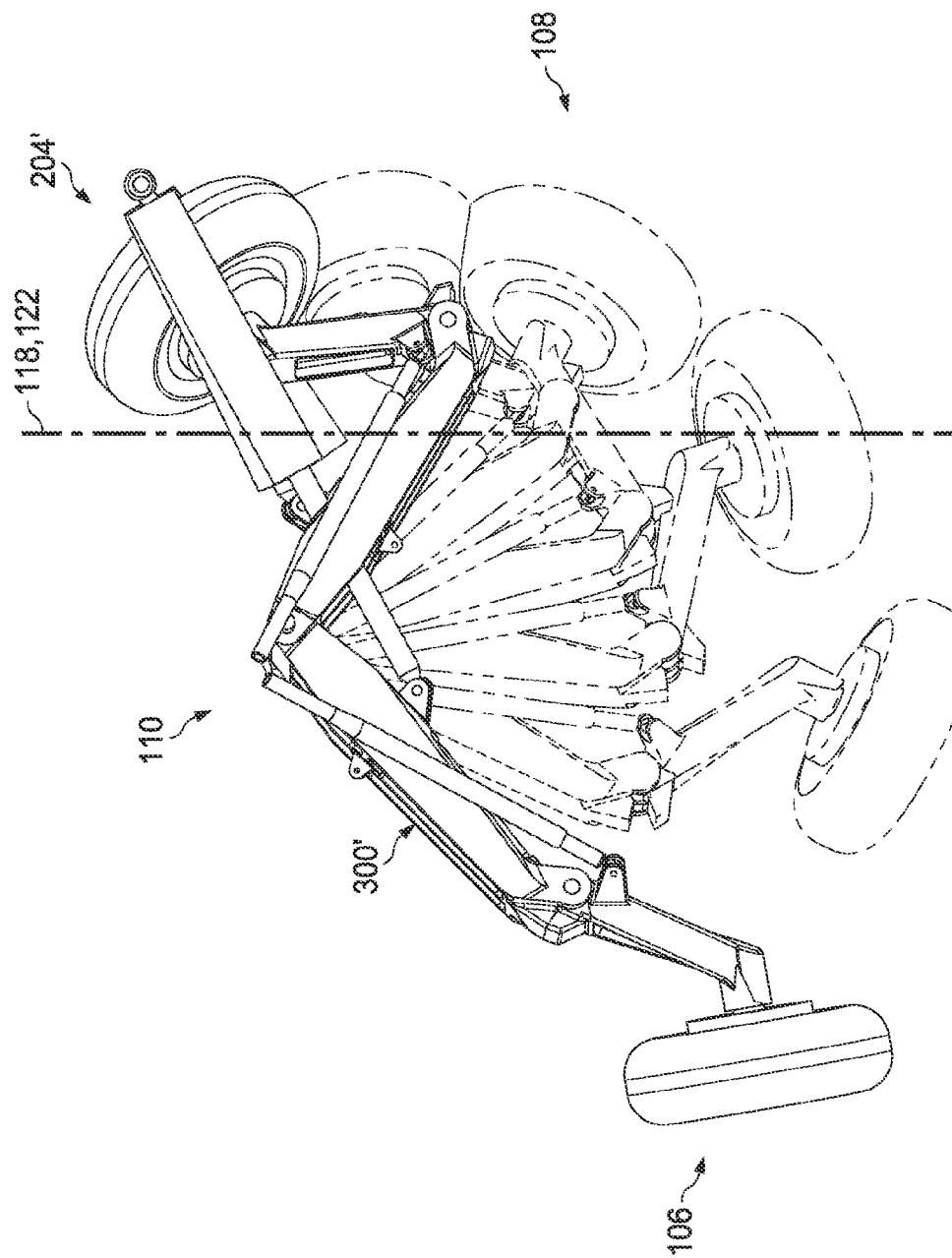
Figure 8C:
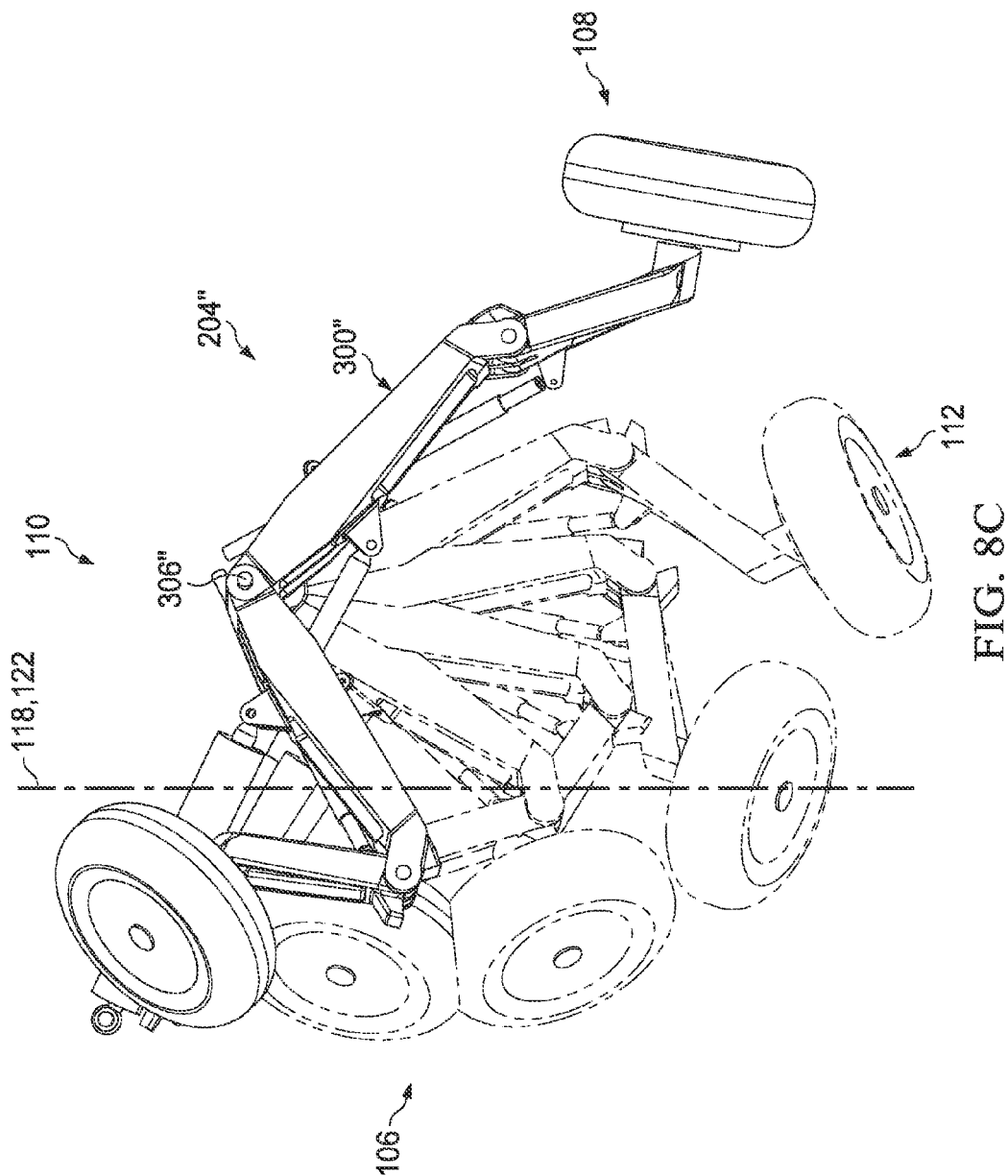

Referring now to FIG. 8A, an orthogonal front bloom display of the retractable systems 204', 204" in each of the configurations of FIGS. 7A-7F and with the various configurations spatially overlapping each other is shown. Referring now to FIG. 8B, an orthogonal front bloom display of the retractable system 204' in each of the configurations of FIGS. 7A-7F and with the various configurations spatially overlapping each other is shown. Referring now to FIG. 8C, an orthogonal front bloom display of the retractable system 204" in each of the configurations of FIGS. 7A-7F and with the various configurations spatially overlapping each other is shown.

Figure 9G:
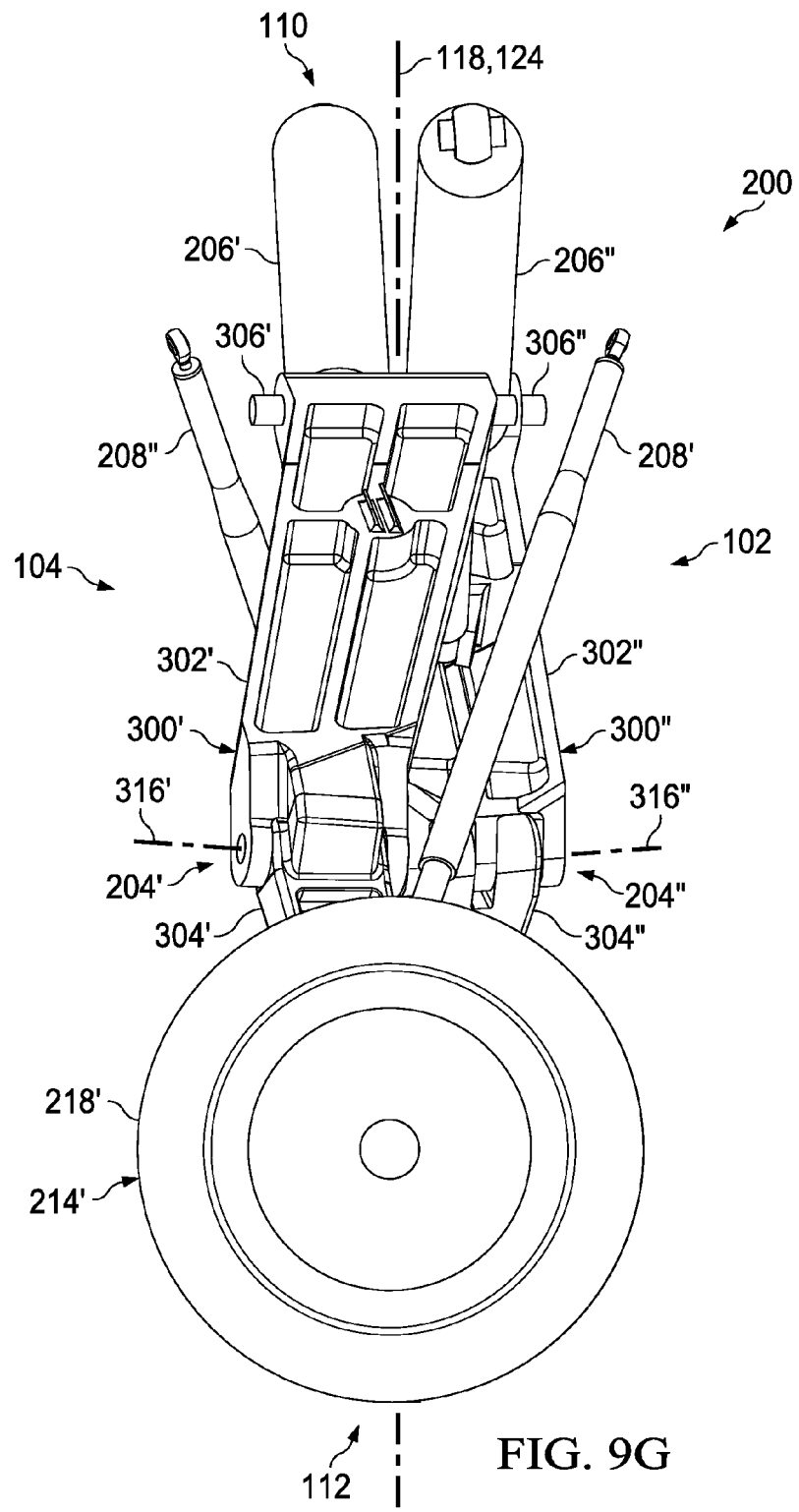

Referring now to FIGS. 9A-9G, a series of orthogonal left views of the retractable systems 204', 204" are shown in a retracted configuration (FIG. 9A), a plurality of intermediate configurations in order of increasing stages of extension (FIGS. 9B-9E), an extended configuration (FIG. 9F), and a loaded configuration (FIG. 9G). It will be appreciated that, in this embodiment, the orthogonal right views of the retractable systems 204 are not provided because they would be identical to orthogonal left views of the retractable systems 204.

Figure 10A:
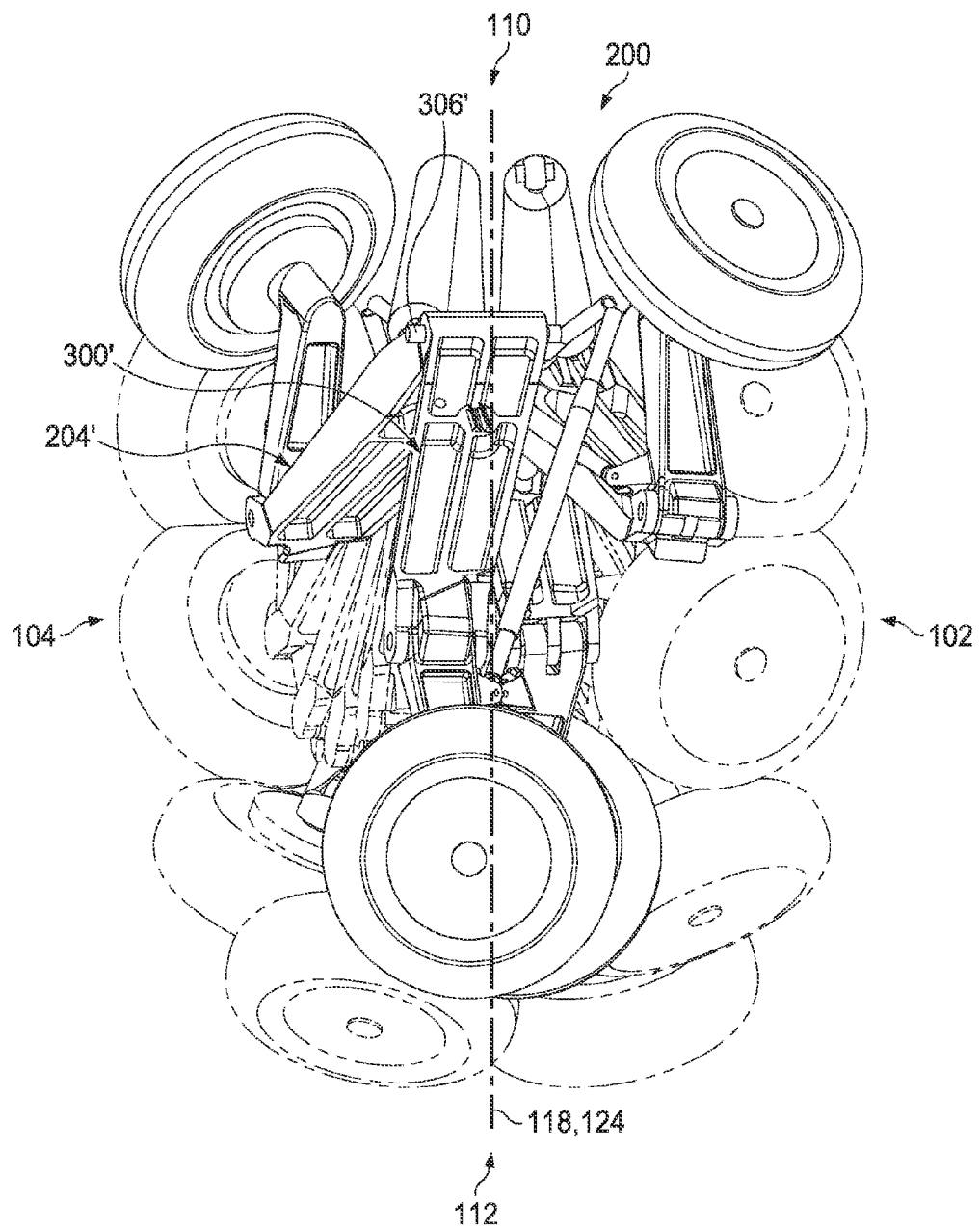
FIGS. 10A-10C are orthogonal left views of both the first retractable system and the second retractable system, the first retractable system, and the second retractable system, respectively, in each of the configurations of FIGS. 9A-9G, with the retracted configurations and loaded configurations in solid lines and intermediate configurations in broken lines.
Figure 10B:
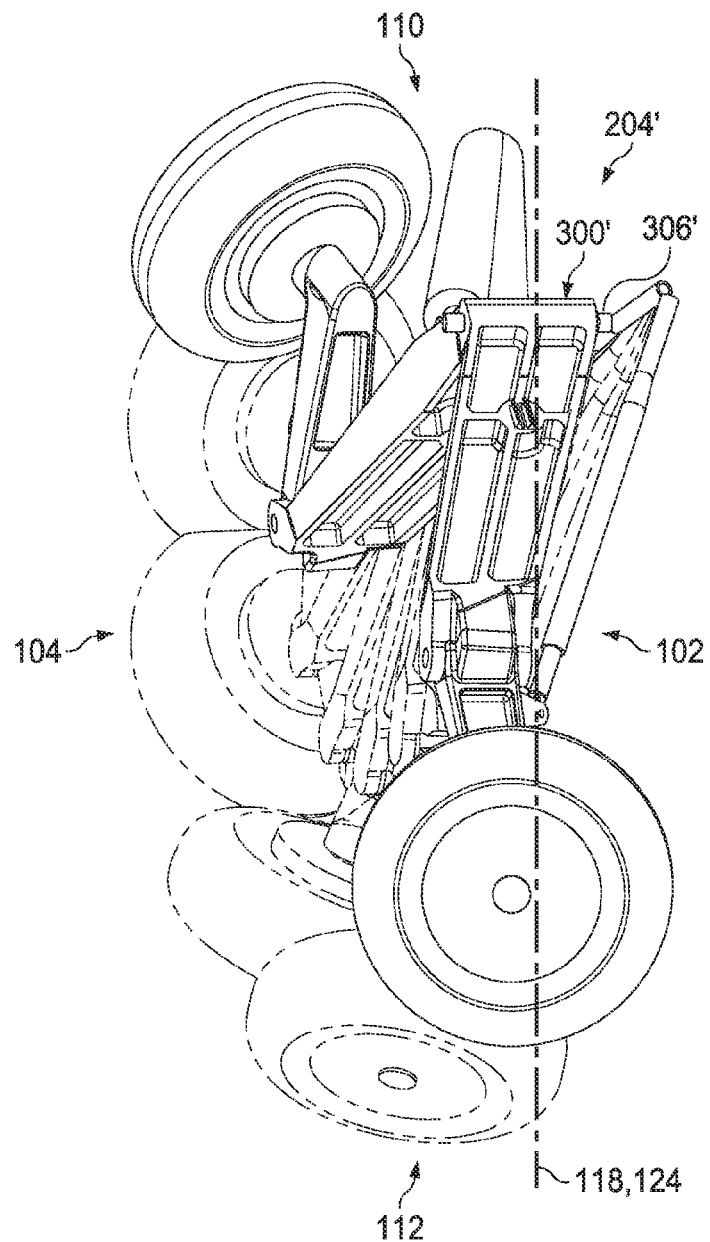
Figure 10C:
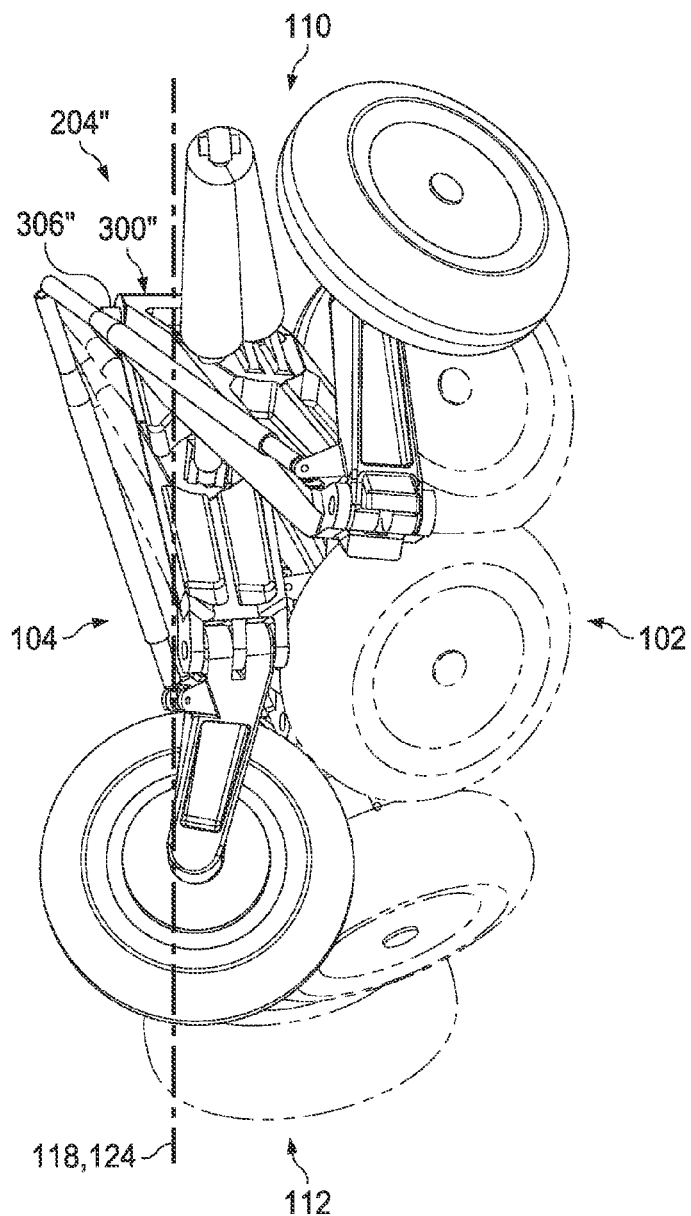

Referring now to FIG. 10A, an orthogonal left bloom display of the retractable systems 204', 204" in each of the configurations of FIGS. 9A-9F and with the various configurations spatially overlapping each other is shown. Referring now to FIG. 10B, an orthogonal left bloom display of the retractable system 204' in each of the configurations of FIGS. 9A-9F and with the various configurations spatially overlapping each other is shown. Referring now to FIG. 10C, an orthogonal left bloom display of the retractable system 204" in each of the configurations of FIGS. 9A-9F and with the various configurations spatially overlapping each other is shown.

Figure 11A:
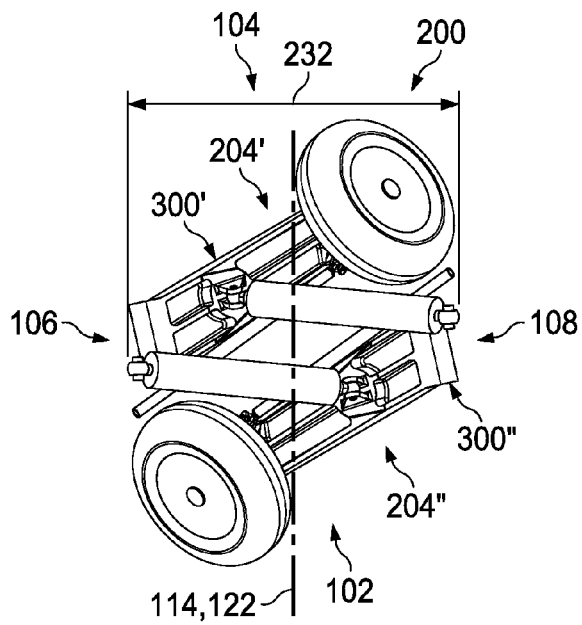
FIGS. 11A-11G are orthogonal top views showing both the first retractable system and the second retractable system in retracted configurations, first extended configurations, second extended configurations, third extended configurations, fourth extended configurations, fifth extended configurations, and loaded configurations, respectively.
Figure 11B:
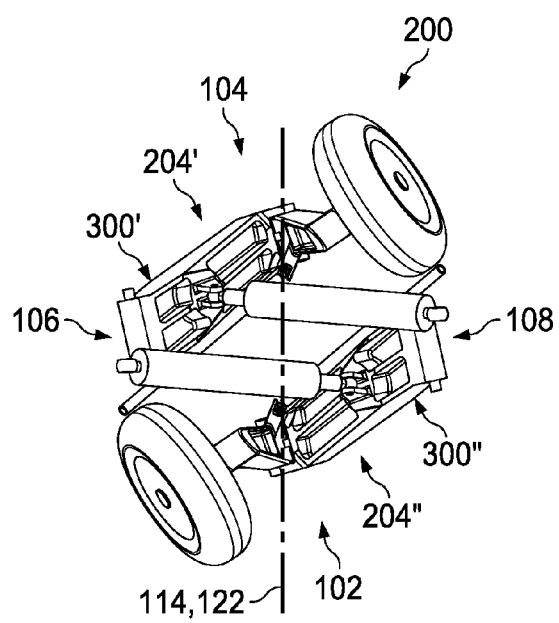
Figure 11C:
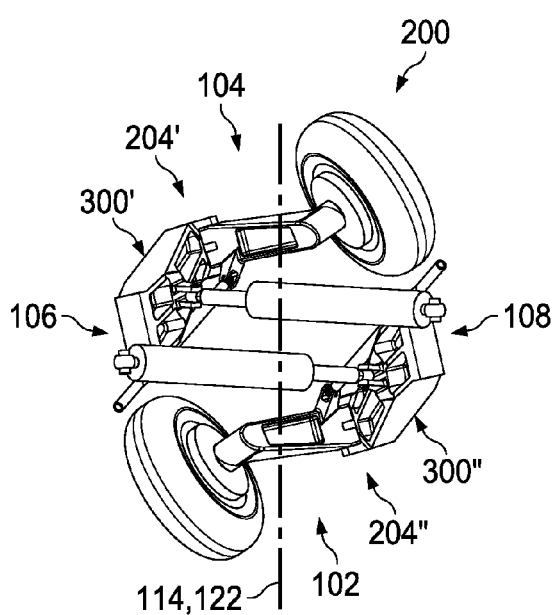
Figure 11D:
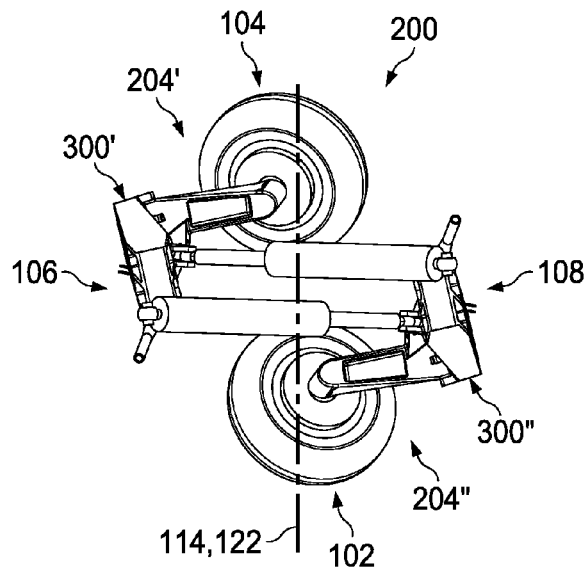
Figure 11E:
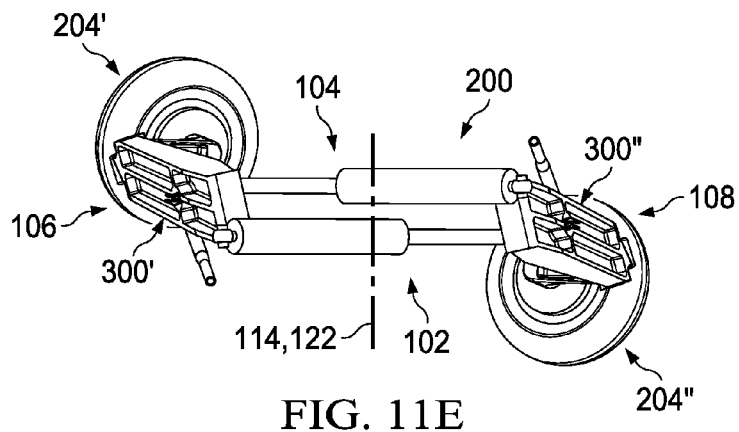
Figure 11F:
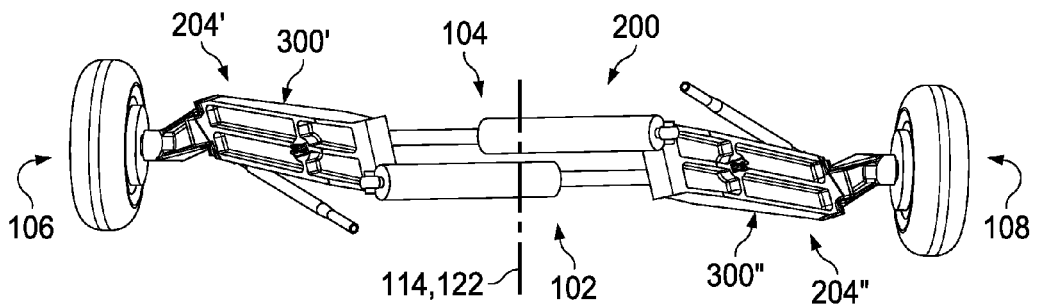
Figure 11G:
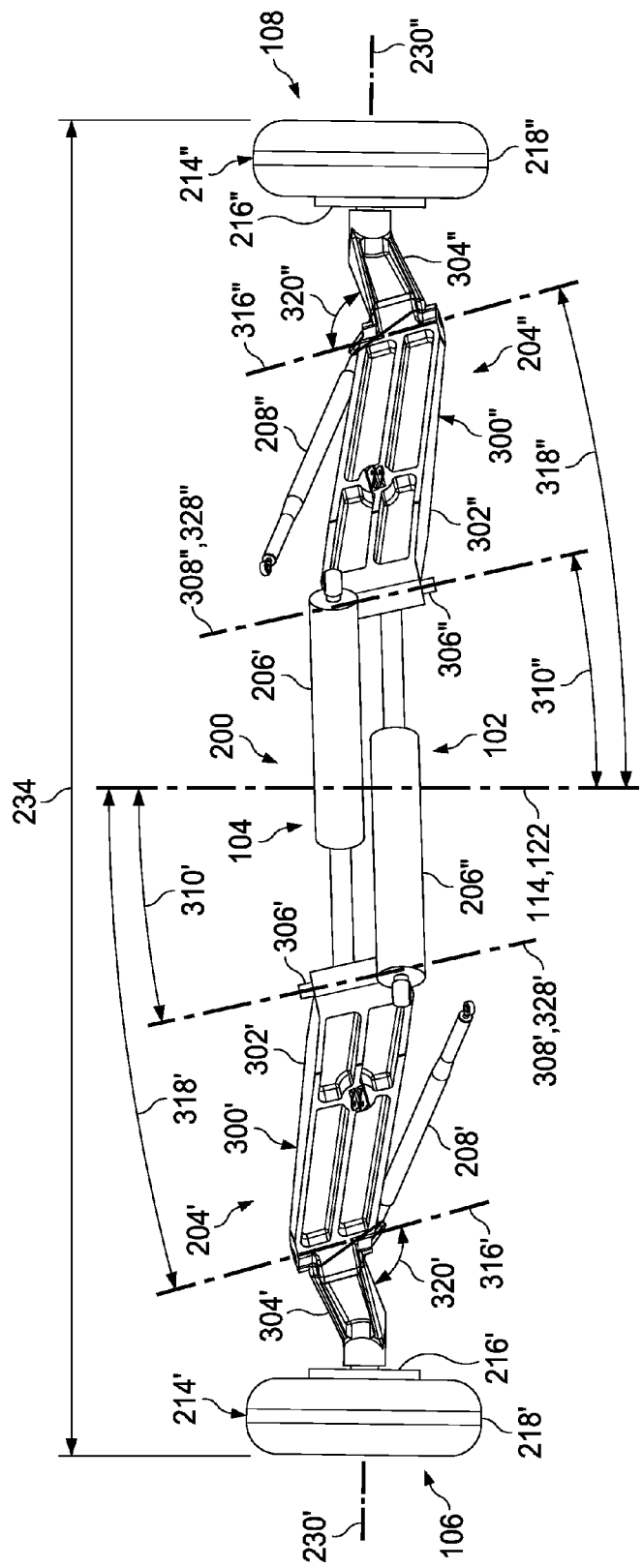

Referring now to FIGS. 11A-11G, a series of orthogonal top views of the retractable systems 204', 204" are shown in a retracted configuration (FIG. 11A), a plurality of intermediate configurations in order of increasing stages of extension (FIGS. 11B-11E), an extended configuration (FIG. 11F), and a loaded configuration (FIG. 11G).

Figure 12A:
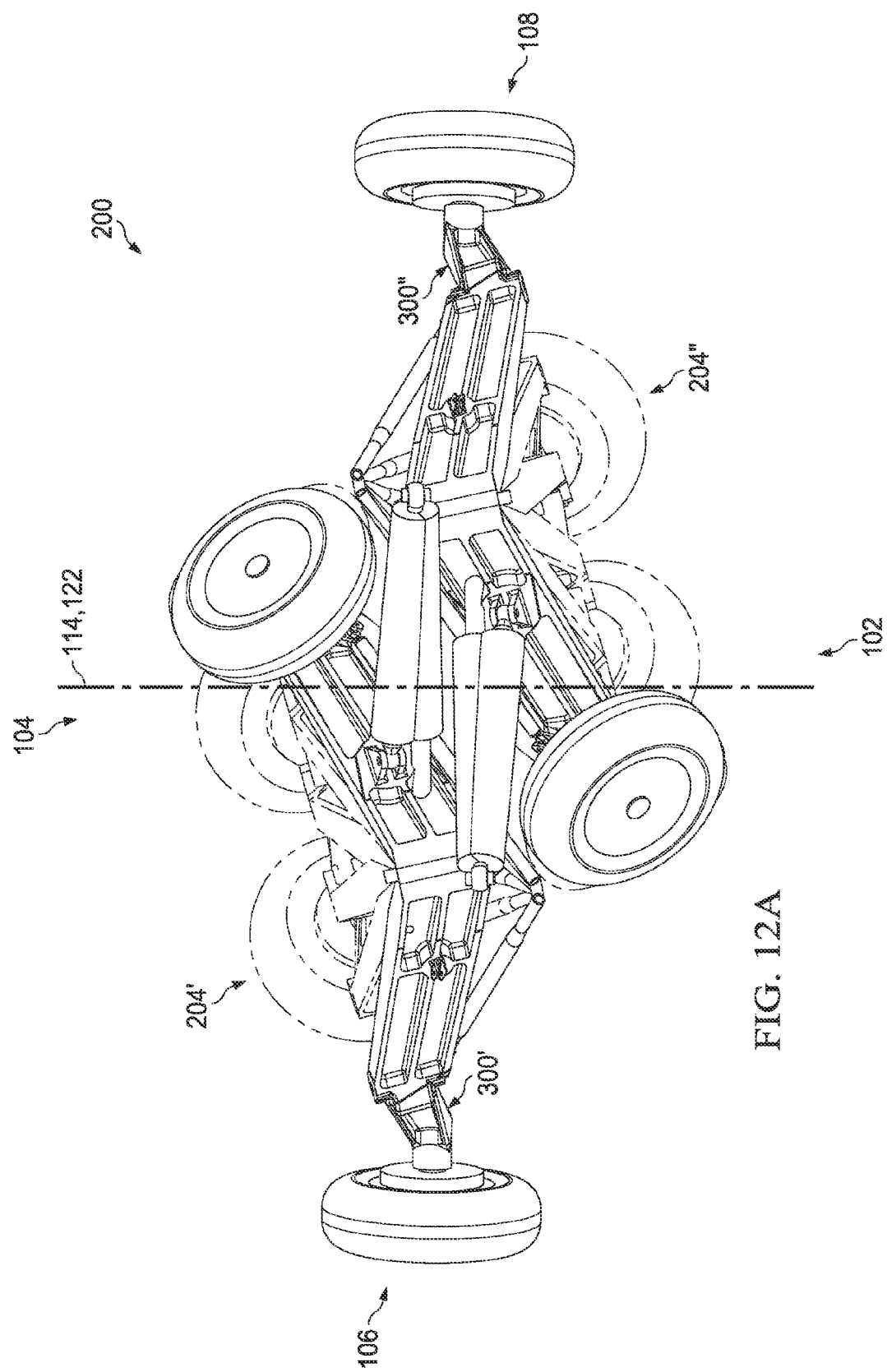
FIGS. 12A-12C are orthogonal top views of both the first retractable system and the second retractable system, the first retractable system, and the second retractable system, respectively, in each of the configurations of FIGS. 11A-11G, with the retracted configurations and loaded configurations in solid lines and intermediate configurations in broken lines.
Figure 12B:
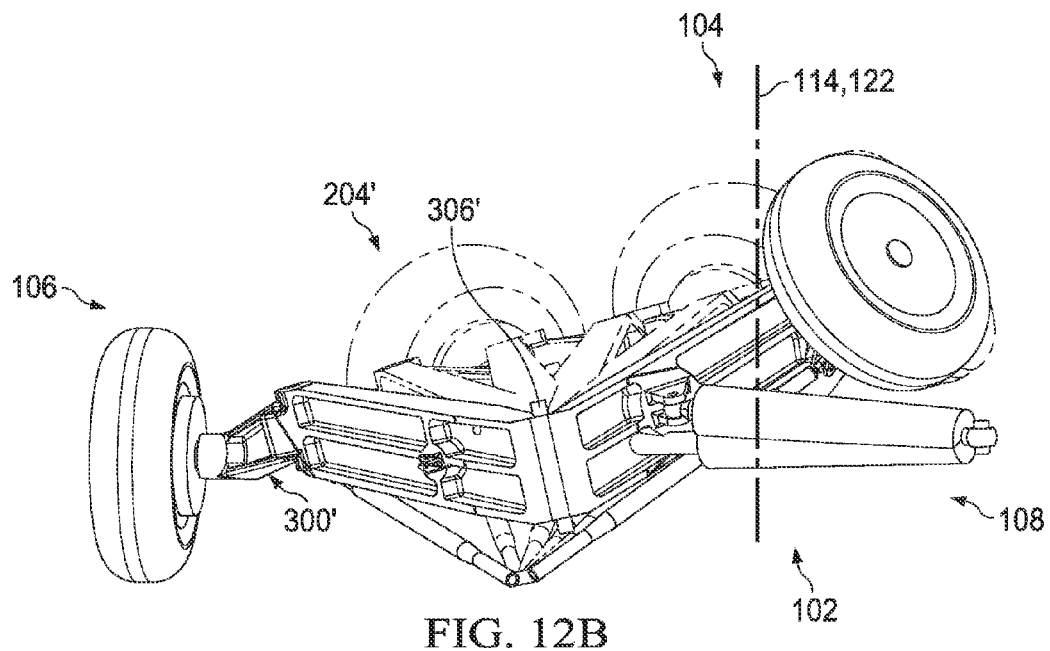
Figure 12C:
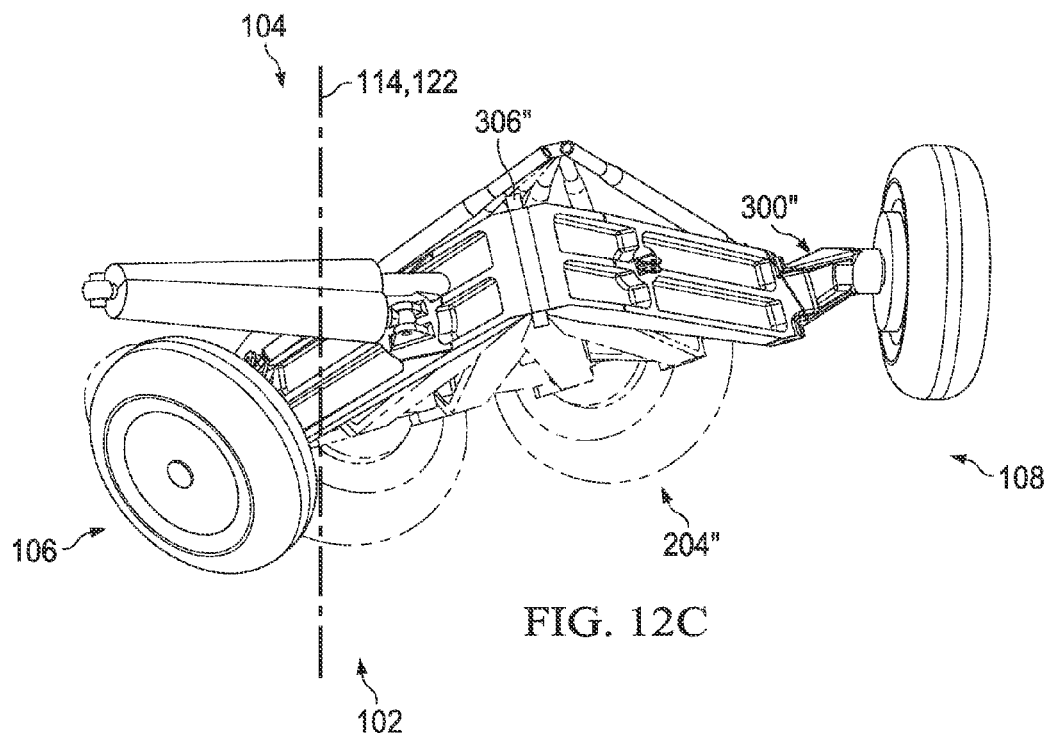

Referring now to FIG. 12A, an orthogonal top bloom display of the retractable systems 204', 204" in each of the configurations of FIGS. 11A-11F and with the various configurations spatially overlapping each other is shown. Referring now to FIG. 12B, an orthogonal top bloom display of the retractable system 204' in each of the configurations of FIGS. 11A-11F and with the various configurations spatially overlapping each other is shown. Referring now to FIG. 12C, an orthogonal top bloom display of the retractable system 204" in each of the configurations of FIGS. 11A-11F and with the various configurations spatially overlapping each other is shown.

Figure 13A:
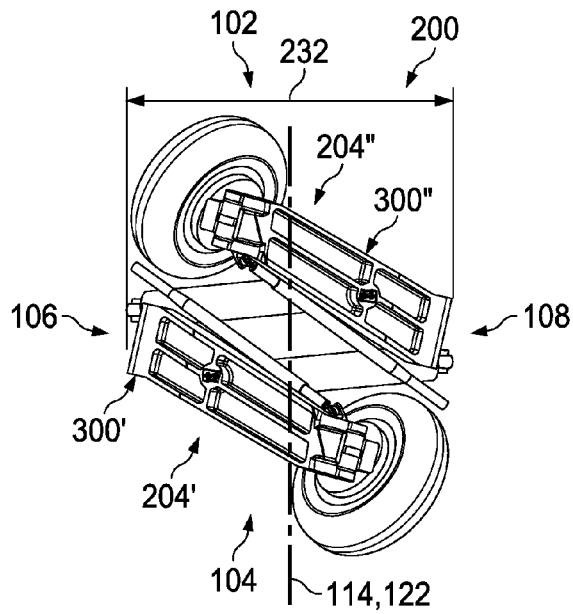
FIGS. 13A-13G are orthogonal bottom views showing both the first retractable system and the second retractable system in retracted configurations, first extended configurations, second extended configurations, third extended configurations, fourth extended configurations, fifth extended configurations, and loaded configurations, respectively.
Figure 13B:
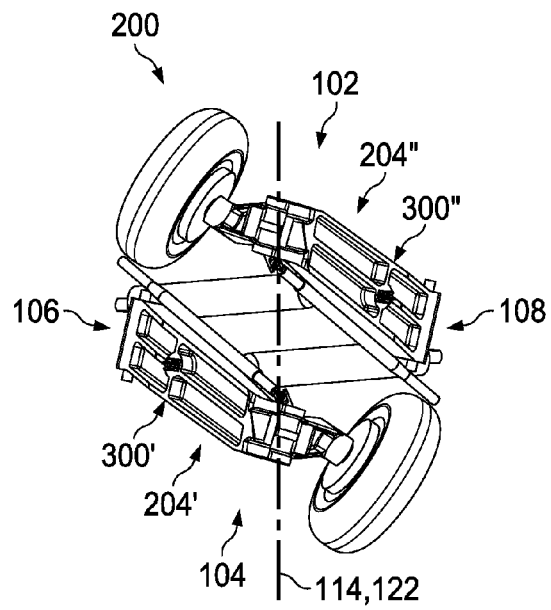
Figure 13C:
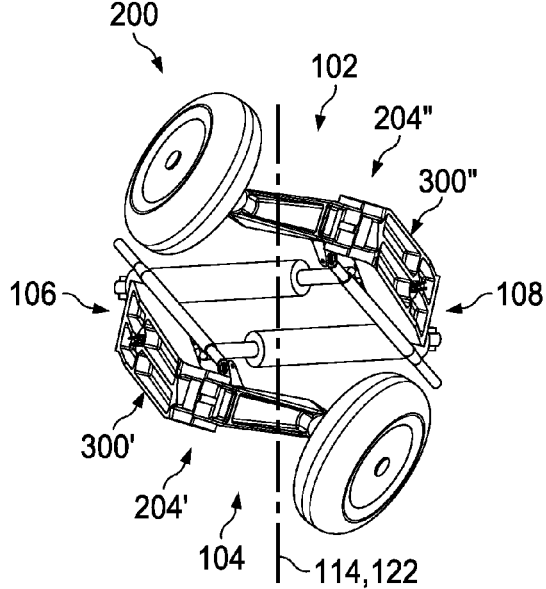
Figure 13D:
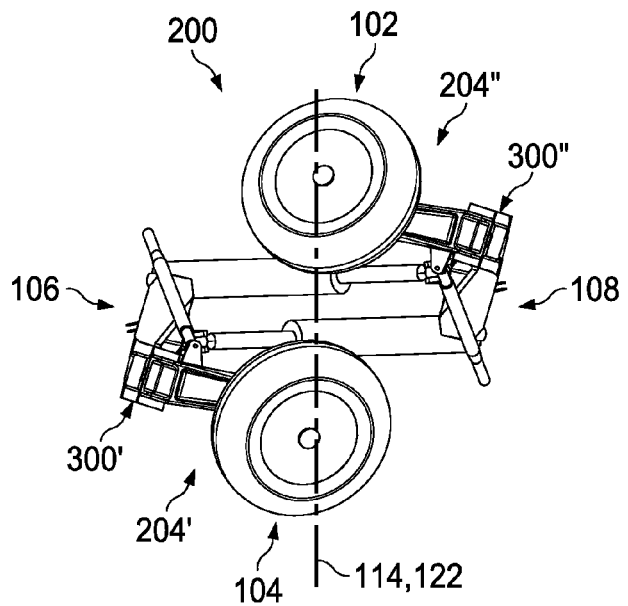
Figure 13E:
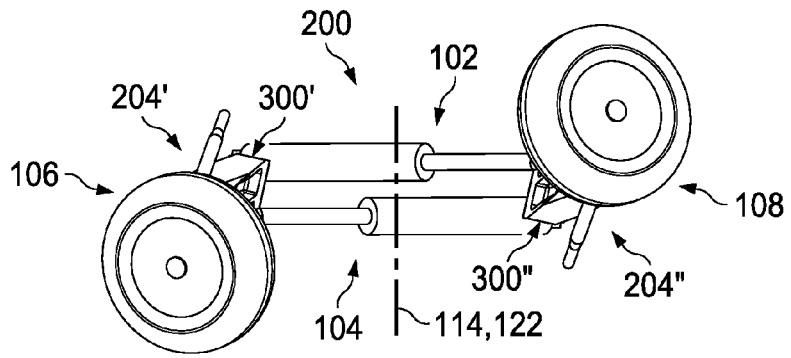
Figure 13F:
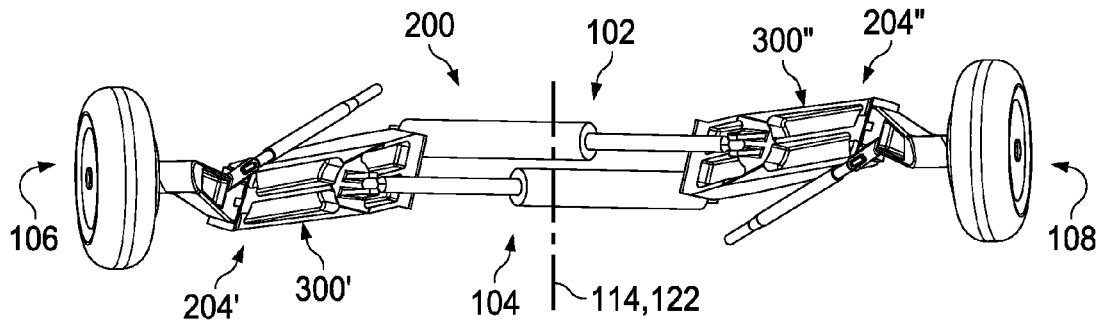
Figure 13G:
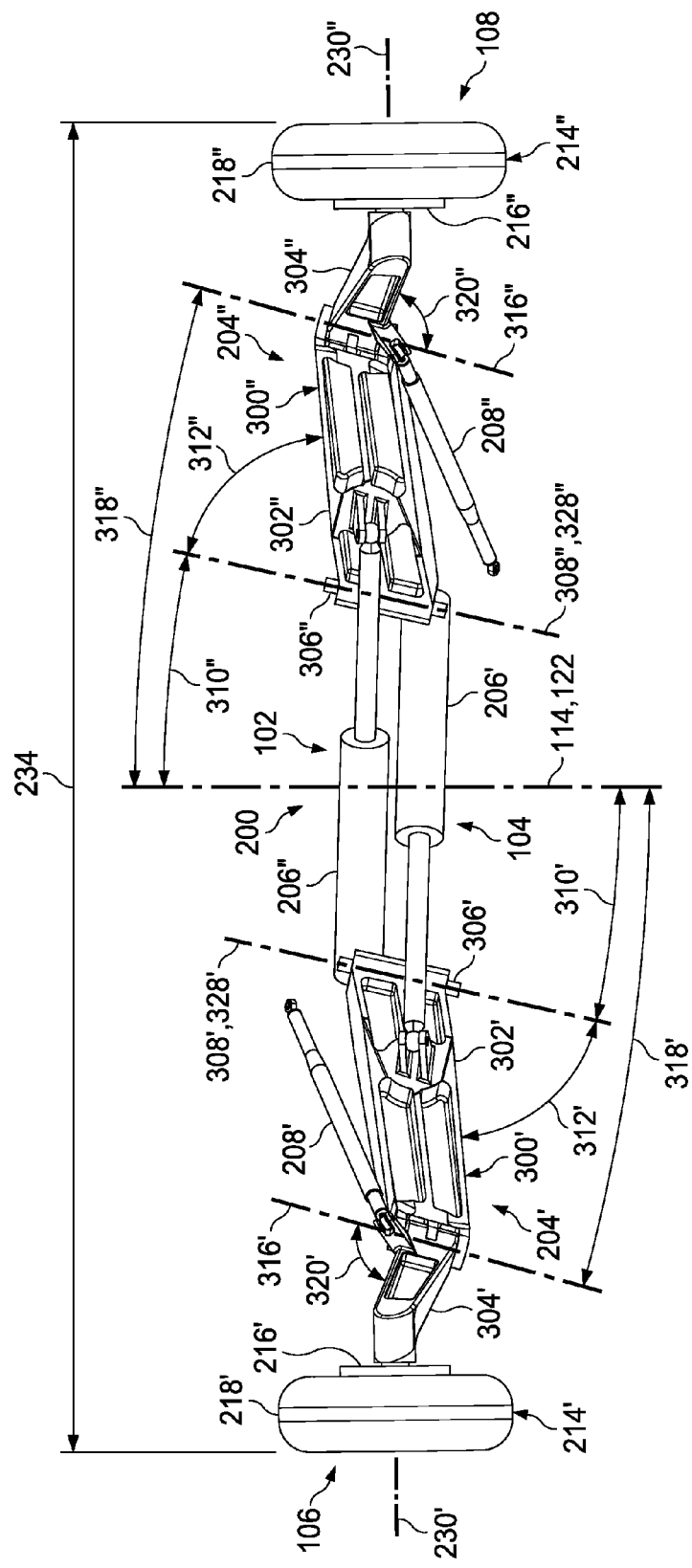

Referring now to FIGS. 13A-13G, a series of orthogonal bottom views of the retractable systems 204', 204" are shown in a retracted configuration (FIG. 13A), a plurality of intermediate configurations in order of increasing stages of extension (FIGS. 13B-13E), an extended configuration (FIG. 13F), and a loaded configuration (FIG. 13G).

Figure 14B:
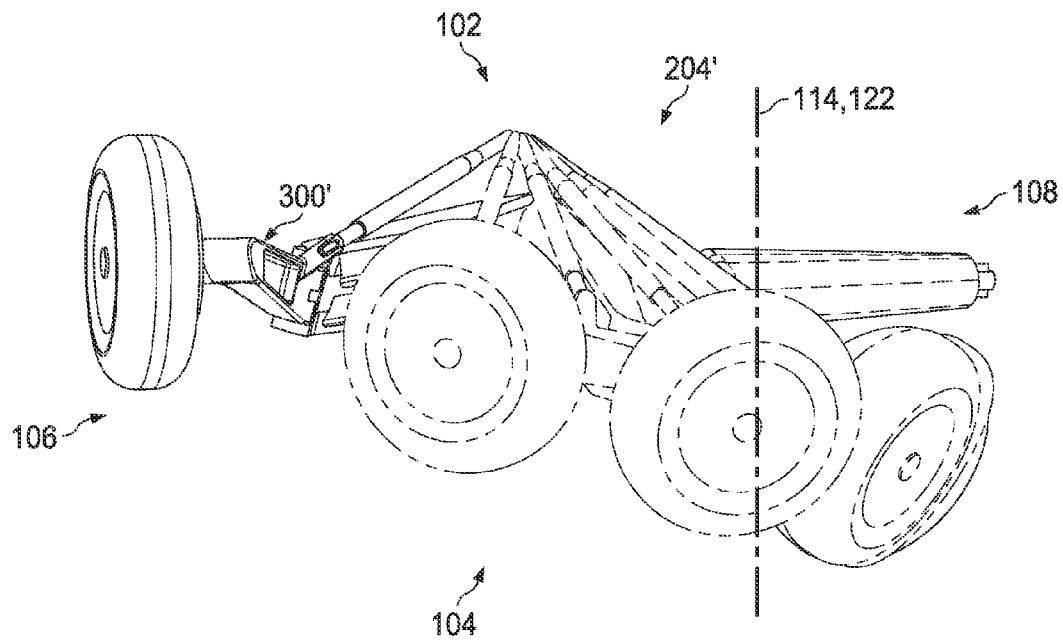
Figure 14C:
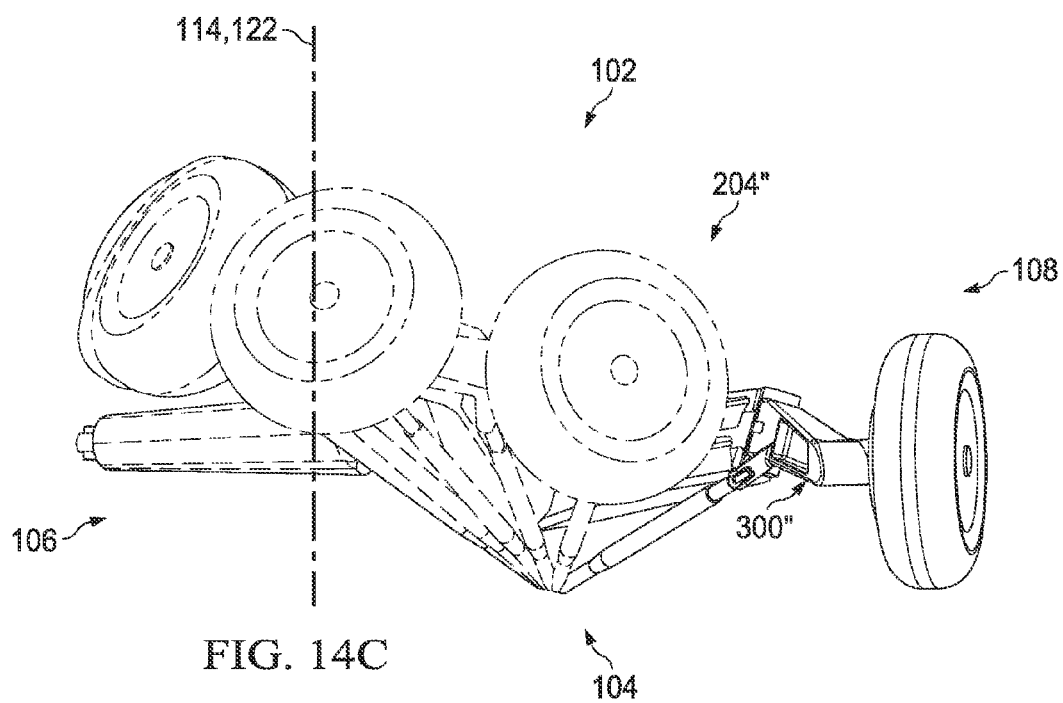

Referring now to FIG. 14A, an orthogonal bottom bloom display of the retractable systems 204', 204" in each of the configurations of FIGS. 13A-13F and with the various configurations spatially overlapping each other is shown. Referring now to FIG. 14B, an orthogonal bottom bloom display of the retractable system 204' in each of the configurations of FIGS. 13A-13F and with the various configurations spatially overlapping each other is shown. Referring now to FIG. 14C, an orthogonal bottom bloom display of the retractable system 204" in each of the configurations of FIGS. 13A-13F and with the various configurations spatially overlapping each other is shown.

In operation, the retractable systems 204 and wheel assemblies 214 may initially be stowed in the bay space 134 and the bay 130 may be substantially enclosed by bay doors 210 when the retractable systems 204 are in the retracted configuration shown in FIG. 3. Next, the actuators 206 may be increased in length to move the retractable systems 204 to the intermediate configuration shown in FIGS. 5A, 7A, 9A, 11A, and 13A. Next, the actuators 206 may be further increased in length to move the retractable systems 204 to the intermediate configuration shown in FIGS. 5B, 7B, 9B, 11B, and 13B. Next, the actuators 206 may be increased in length to move the retractable systems 204 to the intermediate configuration shown in FIGS. 5C, 7C, 9C, 11C, and 13C. Next, the actuators 206 may be further increased in length to move the retractable systems 204 to the intermediate configuration shown in FIGS. 5D, 7D, 9D, 11D, and 13D. Next, the actuators 206 may be further increased in length to move the retractable systems 204 to the intermediate configuration shown in FIGS. 5E, 7E, 9E, 11E, and 13E. Next, the actuators 206 may be further increased in length to move the retractable systems 204 to the extended configuration shown in FIGS. 5F, 7F, 9F, 11F, and 13F. The extended configuration may be associated with the position of the retractable systems 204 while the aircraft 100 remains airborne and is preparing for landing. Next, the aircraft 100 may land and come to rest, thereby causing loading of the retractable systems 204 and resulting in configuration of the retractable systems 204 in the loaded configuration shown in FIGS. 5G, 7G, 9G, 11G, and 13G. In some cases, the above actions may generally be performed in reverse, such as during a take-off sequence of the aircraft 100, to once again stow the retractable systems 204 and wheel assemblies 214 in the bay space 134.

Referring back to FIGS. 9A-9G and FIGS. 11A-11G, it can be seen that, in this embodiment, the tires 218 are not longitudinally aligned in any of the retracted configuration and intermediate configurations of FIGS. 9A-9F and FIGS. 11A-11F. However, upon achievement of the loaded configuration of FIG. 9G and FIG. 11G, the tires 218 are substantially longitudinally aligned with each other. In other words, while the tires 218 are not mirror images of each other about the lateral bisection plane 122 in the retracted configuration and intermediate configurations, the tires 218 are mirror images of each other about the lateral bisection plane 122 when the retractable systems 204 are in the loaded configuration. While the wheel system 214 may be the load that is carried while the retractable system 204 retracts and extends in this embodiment, in alternative embodiments, a different load may be carried by the retractable system 204. For example, in some embodiments, a load such as, but not limited to, a weapon, gun, camera, sensor, display, loud speaker, missile, water cannon, and/or any other suitable load may be carried by the retractable system.

Now referring back to FIGS. 11A-12A and FIGS. 13A-14A, the retractable systems 204', 204" may comprise a minimum lateral width 232 associated with the retracted configuration and a maximum lateral width 234 associated with the loaded configuration. In some embodiments, a lateral width ratio of the minimum lateral width 232 to the maximum lateral width 234 may be equal to a value in a range of about 0.2 to about 0.6, about 0.3 to about 0.5, or equal to a value of about 0.4.

Still referring to FIGS. 11A, 11G, 13A, and 13G, the articulated leg assemblies 300 may comprise primary planes 328 that are coincident with the primary axis of rotation 308 and that are substantially parallel relative to each other. In this embodiment, substantially all of the articulated leg assemblies 300, but for the portions of the upper leg 302 that is not located between the primary axis of rotation 308 and the secondary axis of rotation 316, are located between the primary planes 328 when the articulated leg assemblies 300 are in the retracted configuration. Further, in this embodiment, substantially all of the articulated leg assemblies 300, but for the portions of the upper leg 302 that is not located between the primary axis of rotation 308 and the secondary axis of rotation 316, are located exterior to the space between the primary planes 328 when the articulated leg assemblies 300 are in the extended configuration and/or the loaded configuration. In some embodiments, a distance between the primary planes 328 may be less than a maximum combined length of the upper leg 302 and lower leg 304 as measured orthogonally from the primary axis of rotation 308 with the articulated leg assembly 300 in the extended configuration and/or the loaded configuration.

In some cases, the above-described compact storage of the retractable systems 204 may be at least partially attributable to the asymmetrical and/or general lack of laterally mirrored spatial orientation of the retractable systems 204', 204" relative to the lateral bisection plane 122. Still further, it will be appreciated that the above-described lateral width ratio may be affected by adjusting one or more of a length of the upper leg 302, a length of the lower leg 304, the primary axis longitudinal incidence angle 310, the upper leg offset angle 312, the secondary axis longitudinal incidence angle 318, the lower leg offset angle 320, the secondary axis vertical incidence angle 322, and/or any other variable that may alter the kinematic behavior of the retractable systems 204. In some cases, the retractable systems 204 may generally achieve compact retracted configurations in part as a function of the retractable systems 204', 204" not only folding to reduce the individual vertical footprints but also as a function of the retractable systems 204', 204" comprising vertical footprints that vertically overlap each other.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A vertical support system for an aircraft, comprising:

a first articulated leg assembly configured to carry a first load, the first articulated leg assembly comprising a first upper leg and a first lower leg configured to carry the first load and rotatably connected to the first upper leg and a first wheel assembly, the first articulated leg assembly being selectively movable between a first refracted configuration and a first loaded configuration using a first actuator connected to the first articulated leg assembly; and a second articulated leg assembly configured to carry a second load substantially kinematically identical to the first articulated leg assembly, the second articulated leg assembly comprising a second upper leg and a second lower leg configured to carry the second load and rotatably connected to the second upper leg and a second wheel assembly, the second articulated leg assembly being selectively movable between a second refracted configuration and a second loaded configuration using a second actuator connected to the second articulated leg assembly;

wherein a lateral width ratio is equal to a value of less than about 0.6, the lateral width ratio being defined as a ratio of (1) a minimum lateral width between the lateral extents of a first wheel assembly and a second wheel assembly when the first articulated leg assembly is in the first retracted configuration and the second articulated leg assembly is in the second refracted configuration to (2) a maximum lateral width between the lateral extents of the first wheel assembly and the second wheel assembly when the first articulated leg assembly is in the first loaded configuration and the second articulated leg assembly is in the second loaded configuration;

wherein, with the first articulated leg assembly in the first retracted configuration and the second articulated leg assembly in the second refracted configuration, a first vertical footprint of the first articulated leg assembly and first actuator overlaps a second vertical footprint of the second articulated leg assembly and second actuator; and wherein the first upper leg is rotatable about a first primary axis of rotation, the second upper leg is rotatable about a second primary axis of rotation, the first lower leg is rotatable about a first secondary axis of rotation, and the second lower leg is rotatable about a second secondary axis of rotation, wherein the first articulated leg assembly is symmetric to the second articulated leg assembly about a vertical axis through an origin of the vertical support system as the first articulated leg assembly moves between the first retracted configuration and the first loaded configuration and the second articulated leg assembly moves between the second retracted configuration and the second loaded configuration.

2. The vertical support system of claim 1, wherein at least one of (1) the vertical support system is configured for use as a portion of an aircraft landing gear and (2) the first load comprises the first wheel assembly and the second load comprises the second wheel assembly.

3. The vertical support system of claim 1, wherein the second primary axis of rotation is substantially parallel to the first primary axis of rotation and fixed relative to the first primary axis of rotation, and wherein each of the first primary axis of rotation and the second primary axis of rotation intersect a lateral bisection plane at a primary axis longitudinal incident angle.

4. The vertical support system of claim 3:
wherein the first upper leg is rotatable about the first primary axis of rotation and the first lower leg is selectively rotatable about the first secondary axis of rotation of the first upper leg; and
wherein the second upper leg is rotatable about the second primary axis of rotation and the second lower leg is selectively rotatable about the second secondary axis of rotation of the second upper leg.

5. The vertical support system of claim 4, wherein at least one of (1) the first upper leg generally extends non-orthogonally from the first primary axis of rotation at a first upper leg offset angle relative to the first primary axis of rotation and (2) the second upper leg generally extends non-orthogonally from the second primary axis of rotation at a second upper leg offset angle relative to the second primary axis of rotation.

6. The vertical support system of claim 4, wherein at least one of (1) the first secondary axis of rotation intersects the lateral bisection plane at a first secondary axis longitudinal incident angle while the first articulated leg assembly is in the first loaded configuration as viewed from above and (2) the second secondary axis of rotation intersects the lateral bisection plane at a second secondary axis longitudinal incident angle while the second articulated leg assembly is in the second loaded configuration as viewed from above.

7. The vertical support system of claim 4, wherein at least one of (1) the first lower leg generally extends non-orthogonally from the first secondary axis of rotation at a first lower leg offset angle relative to the first secondary axis of rotation and (2) the second lower leg generally extends non-orthogonally from the second secondary axis of rotation at a second lower leg offset angle relative to the second secondary axis of rotation.

8. The vertical support system of claim 4, wherein at least one (1) the lateral width ratio is equal to a value in a range of about 0.05 to about 0.8, (2) the lateral width ratio is equal to a value in a range of about 0.2 to about 0.6, (3) the lateral width ratio is equal to a value in a range of about 0.3 to about 0.5, or (4) the lateral width ratio is equal to a value of about 0.4.

9. The vertical support system of claim 1, wherein substantially all of the first articulated leg assembly and substantially all of the second articulated leg assembly are configured for being received within an aircraft fuselage when the first articulated leg assembly is in the first retracted configuration and the second articulated leg assembly is in the second refracted configuration, and wherein the aircraft comprises no sponsons or similar structures extending laterally beyond the fuselage for receiving portions of either of the first articulated leg assembly and the second articulated leg assembly.

10. The vertical support system of claim 1, wherein substantially all of the first articulated leg assembly and substantially all of the second articulated leg assembly are configured for being received within an aircraft fuselage when the first articulated leg assembly is in the first retracted configuration and the second articulated leg assembly is in the second refracted configuration, and wherein the aircraft comprises two rotatable doors configured to substantially enclose the first articulated leg assembly and the second articulated leg assembly within the aircraft fuselage when the first articulated leg assembly is in the first retracted configuration and the second articulated leg assembly is in the second refracted configuration.

11. A vertical support system for an aircraft, comprising:
a first articulated leg assembly configured to carry a first load, the first articulated leg assembly comprising a first upper leg and a first lower leg configured to carry the first load and rotatably connected to the first upper leg, the first articulated leg assembly being selectively movable between a first refracted configuration and a first loaded configuration using a first actuator connected to the first articulated leg assembly; and
a second articulated leg assembly configured to carry a second load substantially kinematically identical to the first articulated leg assembly, the second articulated leg assembly comprising a second upper leg and a second lower leg configured to carry the second load and rotatably connected to the second upper leg, the second articulated leg assembly being selectively movable between a second retracted configuration and a second loaded configuration using a second actuator connected to the second articulated leg assembly;
wherein the first articulated leg assembly and the second articulated leg assembly are symmetrical to each other about a vertical axis through an origin of the vertical support system while the first articulated leg assembly is in the first loaded configuration and the second articulated leg assembly is in the second loaded configuration;
wherein the first articulated leg assembly and the second articulated leg assembly are symmetrical to each other about a vertical axis through an origin of the vertical support system while the first articulated leg assembly is in the first refracted configuration and the second articulated leg assembly is in the second refracted configuration; and
wherein a first vertical footprint of the first actuator and the first articulated leg assembly while the first articulated leg assembly is in the first retracted configuration overlaps a second vertical footprint of the second actuator and the second articulated leg assembly while the second articulated leg assembly is in the second retracted configuration.

12. The vertical support system of claim 11, wherein at least one of (1) the vertical support system is configured for use as a portion of an aircraft landing gear and (2) the first load comprises a first wheel assembly and the second load comprises a second wheel assembly.

13. The vertical support system of claim 11, wherein the first articulated leg assembly comprises a first primary axis of rotation, wherein the second articulated leg assembly comprises a second primary axis of rotation substantially parallel to the first primary axis of rotation and fixed relative to the first primary axis of rotation, and wherein each of the first primary axis of rotation and the second primary axis of rotation intersect a lateral bisection plane at a primary axis longitudinal incident angle.

14. The vertical support system of claim 13:
wherein the first upper leg is rotatable about the first primary axis of rotation and the first lower leg is selectively rotatable about a first secondary axis of rotation of the first upper leg; and
wherein the second upper leg is rotatable about the second primary axis of rotation and the second lower leg is selectively rotatable about a second secondary axis of rotation of the second upper leg.

15. The vertical support system of claim 14, wherein at least one of (1) the first upper leg generally extends non-orthogonally from the first primary axis of rotation at a first upper leg offset angle relative to the first primary axis of rotation and (2) the second upper leg generally extends non-orthogonally from the second primary axis of rotation at a second upper leg offset angle relative to the second primary axis of rotation.

16. The vertical support system of claim 14, wherein at least one of (1) the first secondary axis of rotation intersects the lateral bisection plane at a first secondary axis longitudinal incident angle while the first articulated leg assembly is in the first loaded configuration as viewed from above and (2) the second secondary axis of rotation intersects the lateral bisection plane at a second secondary axis longitudinal incident angle while the second articulated leg assembly is in the second loaded configuration as viewed from above.

17. The vertical support system of claim 14, wherein at least one of (1) the first lower leg generally extends non-orthogonally from the first secondary axis of rotation at a first lower leg offset angle relative to the first secondary axis of rotation and (2) the second lower leg generally extends non-orthogonally from the second secondary axis of rotation at a second lower leg offset angle relative to the second secondary axis of rotation.

18. A retractable vertical support system for an aircraft, comprising:
a first articulated leg assembly comprising a first primary axis of rotation and a first primary plane coincident with the first primary axis, wherein the first articulated leg assembly is selectively movable between a first extended configuration and a first refracted configuration using a first actuator connected to the first articulated leg assembly; and
a second articulated leg assembly substantially kinematically similar to the first articulated leg assembly, the second articulated leg assembly comprising a second primary axis of rotation substantially fixed relative to the first primary axis of rotation and substantially parallel to the first primary axis of rotation, the second articulated leg assembly comprising a second primary plane coincident with the second primary axis and substantially parallel to the first primary plane, wherein the second articulated leg assembly is selectively movable between a second extended configuration and a second refracted configuration using a second actuator connected to the second articulated leg assembly;
wherein when the first articulated leg assembly is in the first refracted configuration, substantially all of the first articulated leg assembly is located between the first primary plane and the second primary plane;
wherein when the second articulated leg assembly is in the second refracted configuration, substantially all of the second articulated leg assembly is located between the first primary plane and the second primary plane;
wherein when the first articulated leg assembly is in the first extended configuration, substantially all of the first articulated leg assembly is located exterior to the space between the first primary plane and the second primary plane;
wherein when the second articulated leg assembly is in the second extended configuration, substantially all of the second articulated leg assembly is located exterior to the space between the first primary plane and the second primary plane;
wherein the first articulated leg assembly extends a first extended maximum radial distance from the first primary axis of rotation to a point on the first articulated leg assembly farthest from the first primary axis of rotation when the first articulated leg assembly is in the first extended configuration, wherein the first articulated leg assembly extends a first retracted maximum radial distance from the first primary axis of rotation to a point on the first articulated leg assembly farthest from the first primary axis of rotation when the first articulated leg assembly is in the first refracted configuration, and wherein the first extended maximum radial distance is greater than the first refracted maximum radial distance;
wherein the second articulated leg assembly extends a second extended maximum radial distance from the second primary axis of rotation to a point on the second articulated leg assembly farthest from the second primary axis of rotation when the second articulated leg assembly is in the second extended configuration, wherein the second articulated leg assembly extends a second refracted maximum radial distance from the second primary axis of rotation to a point on the second articulated leg assembly farthest from the second primary axis of rotation when the second articulated leg assembly is in the second refracted configuration, and wherein the second extended maximum radial distance is greater than the second refracted maximum radial distance;
wherein the distance between the first primary plane and the second primary plane is less than each of the first extended maximum radial distance and the second extended maximum radial distance; and
wherein a first vertical footprint of the first actuator and the first articulated leg assembly while the first articulated leg assembly is in the first retracted configuration overlaps a second vertical footprint of the second actuator and the second articulated leg assembly while the second articulated leg assembly is in the second retracted configuration.

19. The retractable vertical support system of claim 18:
the first articulated leg assembly comprising:
a first upper leg rotatable about the first primary axis of rotation; and
a first lower leg rotatably connected to the first upper leg, the first lower leg being selectively rotatable about a first secondary axis of the first upper leg; and
the second articulated leg assembly comprising:
a second upper leg rotatable about the second primary axis of rotation; and
a second lower leg rotatably connected to the second upper leg, the second lower leg being selectively rotatable about a second secondary axis of the second upper leg.

20. The retractable vertical support system of claim 19, wherein the retractable vertical support system is configured for use as a portion of an aircraft landing gear.

21. The retractable vertical support system of claim 20, further comprising:
- a first wheel assembly carried by the first lower leg; and
- a second wheel assembly carried by the second lower leg;
- wherein the first wheel assembly and the second wheel assembly are located as mirror images of each other substantially only while the first articulated leg assembly is in the first extended configuration and the second articulated leg assembly is in the second extended configuration.

* * * * *

UNITED STATES PATENT AND TRADEMARK OFFICE
CERTIFICATE OF CORRECTION

PATENT NO. : 9,051,046 B2  
APPLICATION NO. : 13/622179  
DATED : June 9, 2015  
INVENTOR(S) : Ivans Page 1 of 2

It is certified that error appears in the above-identified patent and that said Letters Patent is hereby corrected as shown below:

On the title page item [57] Line 10, Delete "lees" and insert -- legs --, therefor.

In the claims

Column 12, Line 23, Claim 1, delete "refracted" and insert -- retracted --, therefor.

Column 12, Line 34, Claim 1, delete "refracted" and insert -- retracted --, therefor.

Column 12, Line 44, Claim 1, delete "refracted" and insert -- retracted --, therefor.

Column 12, Line 52, Claim 1, delete "refracted" and insert -- retracted --, therefor.

Column 13, Line 61, Claim 9, delete "refracted" and insert -- retracted --, therefor.

Column 14, Line 4, Claim 10, delete "refracted" and insert -- retracted --, therefor.

Column 14, Line 9, Claim 10, delete "refracted" and insert -- retracted --, therefor.

Column 14, Line 18, Claim 11, delete "refracted" and insert -- retracted --, therefor.

Column 14, Line 43, Claim 11, delete "refracted" and insert -- retracted --, therefor.

Column 14, Line 44, Claim 11, delete "refracted" and insert -- retracted --, therefor.

Column 15, Line 43, Claim 18, delete "refracted" and insert -- retracted --, therefor.

Column 15, Line 57, Claim 18, delete "refracted" and insert -- retracted --, therefor.

Column 15, Line 61, Claim 18, delete "refracted" and insert -- retracted --, therefor.

Signed and Sealed this  
Fifth Day of April, 2016

Michelle K. Lee  
*Director of the United States Patent and Trademark Office*

CERTIFICATE OF CORRECTION (continued)
U.S. Pat. No. 9,051,046 B2

In the claims

Column 15, Line 65, Claim 18, delete "refracted" and insert -- retracted --, therefor.

Column 16, Line 22, Claim 18, delete "refracted" and insert -- retracted --, therefor.

Column 16, Line 24, Claim 18, delete "refracted" and insert -- retracted --, therefor.

Column 16, Line 31, Claim 18, delete "refracted" and insert -- retracted --, therefor.

Column 16, Line 37, Claim 18, delete "refracted" and insert -- retracted --, therefor.

Column 16, Line 39, Claim 18, delete "refracted" and insert -- retracted --, therefor.